US011514293B2

(12) United States Patent
Villegas et al.

(10) Patent No.: US 11,514,293 B2
(45) Date of Patent: Nov. 29, 2022

(54) FUTURE OBJECT TRAJECTORY PREDICTIONS FOR AUTONOMOUS MACHINE APPLICATIONS

(71) Applicant: NVIDIA Corporation, San Jose, CA (US)

(72) Inventors: Ruben Villegas, Ann Arbor, MI (US); Alejandro Troccoli, San Jose, CA (US); Iuri Frosio, San Jose, CA (US); Stephen Tyree, University City, MO (US); Wonmin Byeon, Santa Clara, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 699 days.

(21) Appl. No.: 16/564,978

(22) Filed: Sep. 9, 2019

(65) Prior Publication Data

US 2020/0082248 A1 Mar. 12, 2020

Related U.S. Application Data

(60) Provisional application No. 62/729,659, filed on Sep. 11, 2018.

(51) Int. Cl.
*G06N 3/04* (2006.01)
*G06N 3/08* (2006.01)
*B60W 40/02* (2006.01)

(52) U.S. Cl.
CPC ........... *G06N 3/0445* (2013.01); *B60W 40/02* (2013.01); *G06N 3/08* (2013.01); *G06N 3/0454* (2013.01)

(58) Field of Classification Search
CPC ...... G06N 3/0445; G06N 3/08; G06N 3/0454; G06N 3/0472; G06N 20/10; G06N 20/20; G06N 5/003; B60W 40/02
See application file for complete search history.

(56) References Cited

U.S. PATENT DOCUMENTS 10,885,698 B2    1/2021  Muthler et al.
11,003,189 B2 *  5/2021  Refaat .................. G08G 1/0129
(Continued)

FOREIGN PATENT DOCUMENTS

WO    20160156236 A1   10/2016
WO    WO-2016156236 A1 * 10/2016

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Lewis G West
(74) *Attorney, Agent, or Firm* — Taylor English Duma LLP

(57) ABSTRACT

In various examples, historical trajectory information of objects in an environment may be tracked by an ego-vehicle and encoded into a state feature. The encoded state features for each of the objects observed by the ego-vehicle may be used—e.g., by a bi-directional long short-term memory (LSTM) network—to encode a spatial feature. The encoded spatial feature and the encoded state feature for an object may be used to predict lateral and/or longitudinal maneuvers for the object, and the combination of this information may be used to determine future locations of the object. The future locations may be used by the ego-vehicle to determine a path through the environment, or may be used by a simulation system to control virtual objects—according to trajectories determined from the future locations—through a simulation environment.

20 Claims, 15 Drawing Sheets

(56) References Cited

U.S. PATENT DOCUMENTS

| | | | |
|---|---|---|---|
| 11,017,550 B2* | 5/2021 | Frossard | B60K 31/0008 |
| 11,062,141 B2* | 7/2021 | Choi | G06N 7/005 |
| 11,195,418 B1* | 12/2021 | Hong | G06N 3/0454 |
| 11,200,489 B2* | 12/2021 | Cohen | G06N 3/08 |
| 11,256,964 B2* | 2/2022 | Brown | G06N 3/0445 |
| 11,315,421 B2* | 4/2022 | Su | B60W 30/162 |
| 2018/0053108 A1* | 2/2018 | Olabiyi | G06N 7/005 |
| 2018/0336466 A1* | 11/2018 | Braun | G06V 20/10 |
| 2019/0303759 A1 | 10/2019 | Farabet et al. | |
| 2019/0384994 A1* | 12/2019 | Frossard | G06K 9/6273 |
| 2020/0082248 A1* | 3/2020 | Villegas | B60W 40/02 |
| 2020/0104641 A1* | 4/2020 | Alvelda, VII | G06F 16/9024 |
| 2020/0324794 A1* | 10/2020 | Ma | G06N 3/08 |
| 2020/0327359 A1* | 10/2020 | Blundell | G06K 9/6262 |
| 2020/0364554 A1* | 11/2020 | Wang | G06T 7/20 |
| 2021/0081715 A1* | 3/2021 | Rosman | G06N 3/0445 |
| 2021/0103744 A1* | 4/2021 | Gao | G06N 3/0454 |
| 2021/0192748 A1* | 6/2021 | Morales Morales | G06N 3/0445 |
| 2021/0286371 A1* | 9/2021 | Choi | G06N 3/088 |
| 2022/0011122 A1* | 1/2022 | He | G01C 21/3885 |
| 2022/0144256 A1* | 5/2022 | Narayanan | G08G 1/166 |
| 2022/0169278 A1* | 6/2022 | Refaat | G06N 3/08 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

International Preliminary Report on Patentability received for PCT Application No. PCT/US2019/050236, dated Mar. 25, 2021, 11 pages.

Deo, Nachiket, and Mohan M. Trivedi. "Convolutional social pooling for vehicle trajectory prediction." In Proceedings of the IEEE Conference on Computer Vision and Pattern Recognition Workshops, pp. 1468-1476. 2018.

Djuric, Nemanja, Vladan Radosavljevic, Henggang Cui, Thi Nguyen, Fang-Chieh Chou, Tsung-Han Lin, and Jeff Schneider. "Motion prediction of traffic actors for autonomous driving using deep convolutional networks." arXiv preprint arXiv:1808.05819 (2018).

International Search Report and Written Opinion dated Dec. 5, 2019 in International Patent Application No. PCT/US2019/050236. 16 pages.

* cited by examiner

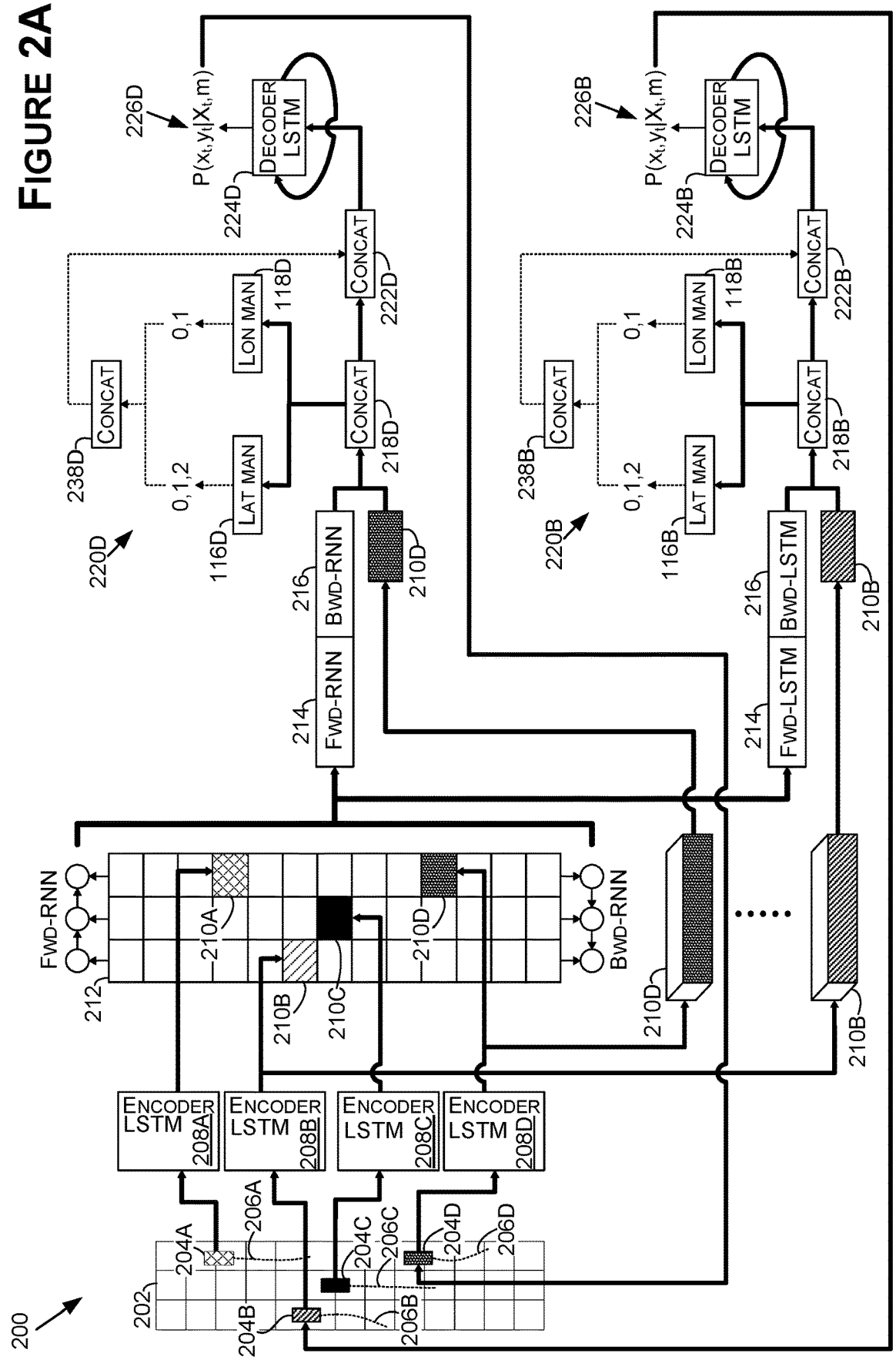

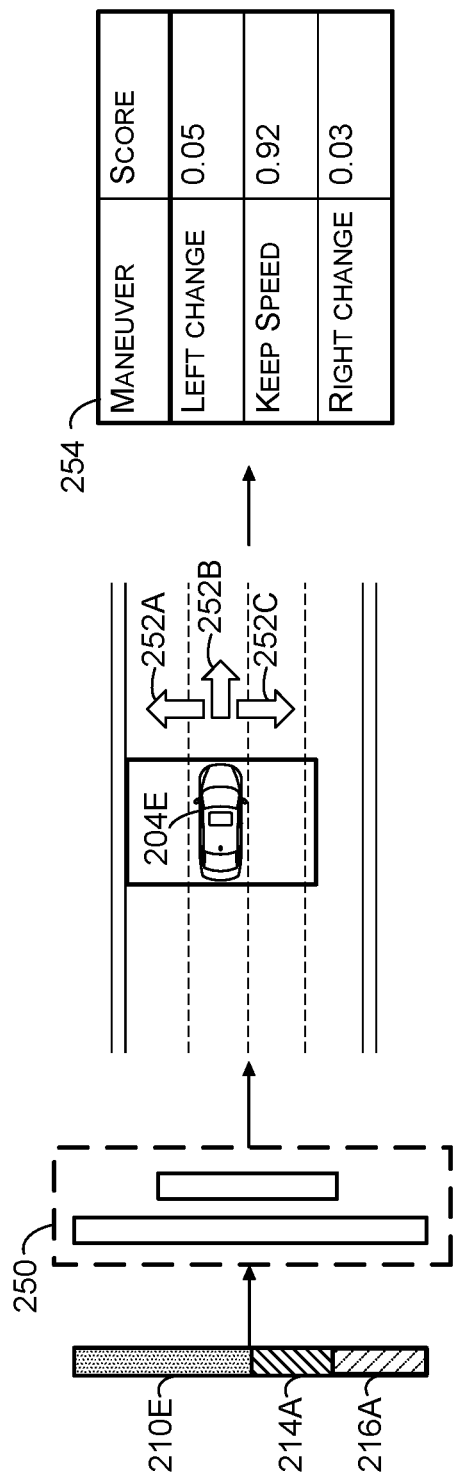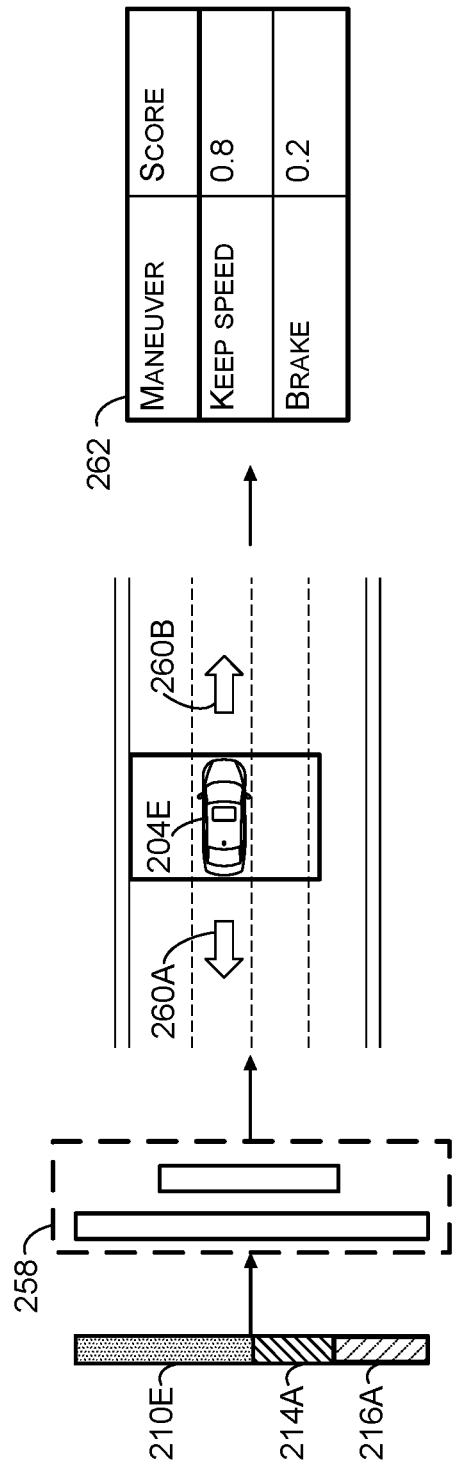
FIGURE 2F
FIGURE 2G

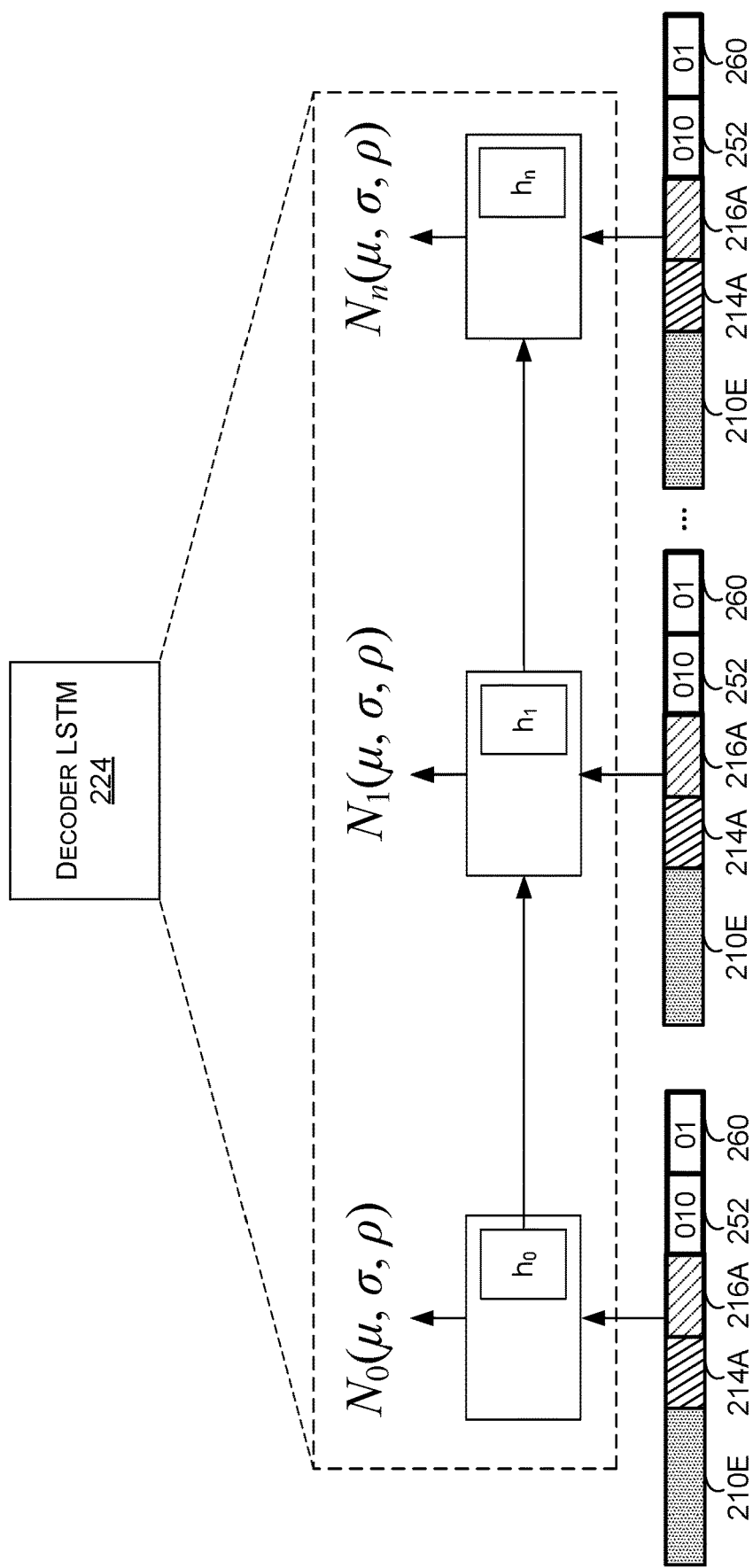

FUTURE OBJECT TRAJECTORY PREDICTIONS FOR AUTONOMOUS MACHINE APPLICATIONS

CROSS-REFERENCE TO RELATED APPLICATIONS

This application claims the benefit of U.S. Provisional Application No. 62/729,659, filed on Sep. 11, 2018, which is hereby incorporated by reference in its entirety.

BACKGROUND

For autonomous vehicles to navigate effectively, the autonomous vehicles need to generate an understanding of the surrounding environment. For example, identifying locations of nearby cars, pedestrians, traffic signs and signals, and road configurations are key aspects for enabling safe control by autonomous vehicles. In addition to current locations and configurations of objects in the environment, determining possible future trajectories of these objects over time—through observation by the autonomous vehicles—may prove effective in fully understanding and accounting for predicted changes in the environment.

Conventional systems have leveraged past object trajectory information using convolutional social pooling. For example, motion of objects in an environment may be encoded using a long short-term memory (LSTM) network, and each object may be populated within a spatial grid. The spatial grid may then be applied to convolutional and pooling layers for social context encoding. The social context encoding and the motion encoding for a single object may then be used to predict future motion of the single object. However, these conventional approaches are limited to predicting future locations for a single object at a time—thereby limiting the effectiveness of the information for autonomous driving applications. Where these conventional processes are repeated for each object, the runtime of the system becomes ineffective for real-time deployment due to the processing burden on the system. In addition, by using convolutional and pooling layers for social context encoding, the results of these conventional systems often result in overfitting to the training data.

SUMMARY

Embodiments of the present disclosure relate to future object trajectory predictions for autonomous machine applications. Systems and methods are disclosed that relate to leveraging machine learning models—such as long short-term memory (LSTM) networks—to predict future trajectories of objects in an environment based on an understanding of past trajectories of, and spatial relationships between, the objects.

In contrast to conventional systems, such as those described above, the system of the present disclosure leverages an ego-vehicle to track objects in the environment over time. For example, the present system may predict future trajectories of each of the objects in the environment while only requiring tracking each object trajectory once. In addition, the trajectories for multiple objects may be computed in parallel, thereby decreasing runtime and enabling the system to execute accurately, and in real-time, for autonomous vehicle applications. Further, in some embodiments, a bi-directional LSTM may be used to generate spatial encodings representative of each of the objects in the environment and their positions relative to one another. By using a bi-directional LSTM, more context is captured by the spatial encodings—as compared to conventional systems—because the spatial relationships between the objects are encoded from different perspectives. In addition, future locations of objects predicted by the system may be used as inputs for predicting subsequent future locations—thereby increasing the accuracy of the system, especially for predictions further into the future.

BRIEF DESCRIPTION OF THE DRAWINGS

The present systems and methods for future object trajectory predictions for autonomous machine applications is described in detail below with reference to the attached drawing figures, wherein:

FIG. 2A includes a trajectory prediction model, in accordance with some embodiments of the present disclosure;

FIG. 2F includes an example illustration for predicting lateral maneuvers of an object, in accordance with some embodiments of the present disclosure;

FIG. 2G includes an example illustration for predicting longitudinal maneuvers of an object, in accordance with some embodiments of the present disclosure;

FIG. 2H includes an example illustration for predicting future locations of an object, in accordance with some embodiments of the present disclosure;

DETAILED DESCRIPTION

Systems and methods are disclosed related to future object trajectory predictions for autonomous machine applications. Although the present disclosure may be described with respect to an example autonomous vehicle 500 (alternatively referred to herein as "vehicle 500", "ego-vehicle 500", or "autonomous vehicle 500," an example of which is described with respect to FIGS. 5A-5D, this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving or ADAS systems, this is not intended to be limiting. For example, the systems and methods described herein may be used in simulation environment (e.g., to more accurately simulate movement and control of objects in the simulation environment), in robotics, aerial systems, boating systems, and/or other technology areas, such as for perception, world model management, path planning, obstacle avoidance, and/or other processes.

Figure 1:
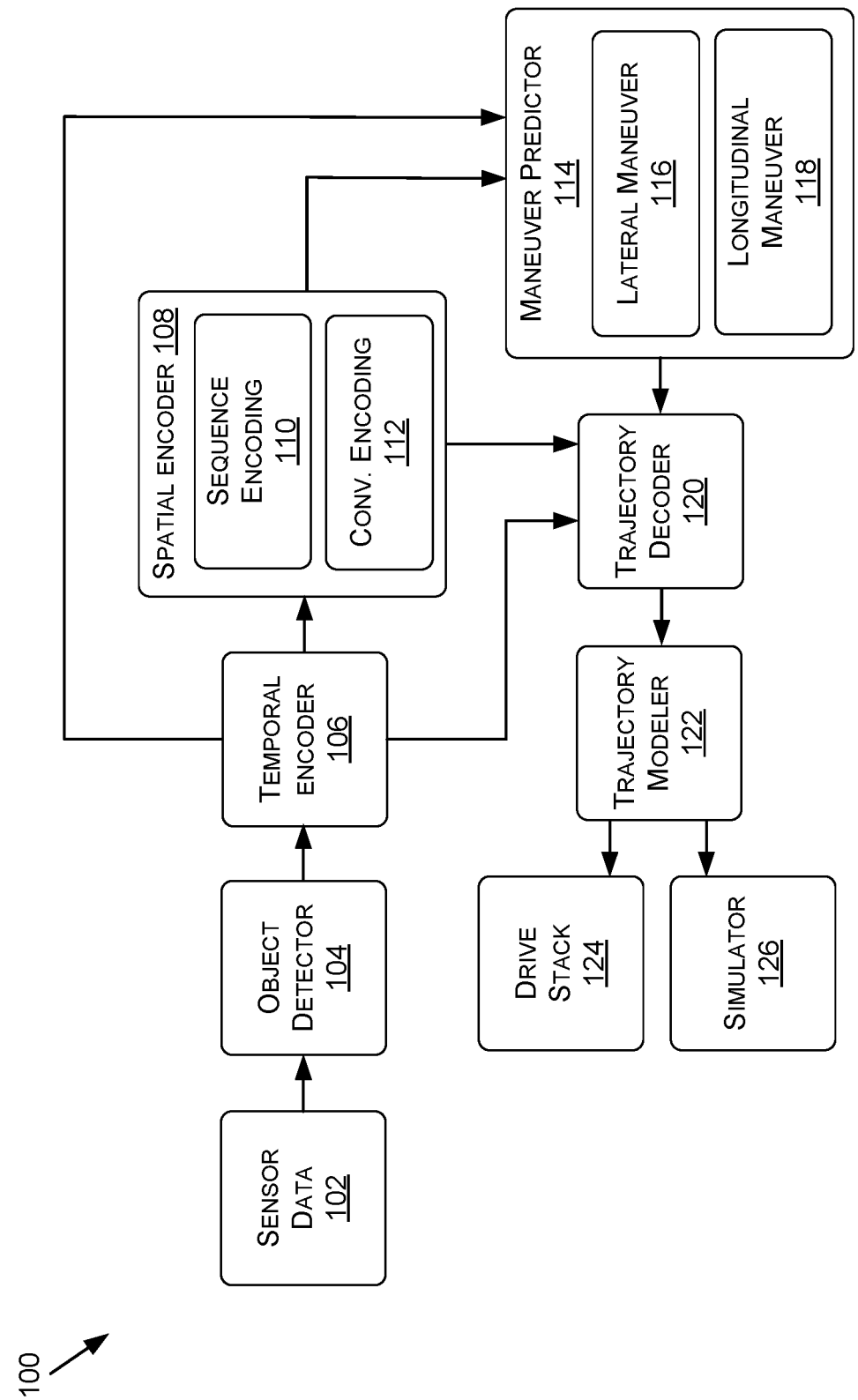
FIG. 1 includes an example data flow diagram for a process of predicting trajectories of one or more objects in an environment, in accordance with some embodiments of the present disclosure.

Now referring to FIG. 1, FIG. 1 includes an example data flow diagram for a process 100 of predicting trajectories of one or more objects in an environment, in accordance with some embodiments of the present disclosure. The process 100 may include generating and/or receiving sensor data 102 from one or more sensors of the vehicle 500. The sensor data 102 may be used by the vehicle 500, and within the process 100, to predict future trajectories of one or more objects—such as other vehicles, pedestrians, etc.—in the environment. The sensor data 102 may include, without limitation, sensor data 102 from any of the sensors of the vehicle 500 (and/or other vehicles or objects, such as robotic devices, VR systems, AR systems, etc., in some examples). For example, and with reference to FIGS. 5A-5C, the sensor data 102 may include the data generated by, without limitation, global navigation satellite systems (GNSS) sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), and/or other sensor types.

In some examples, the sensor data 102 may include the sensor data generated by one or more forward-facing sensors, side-view sensors, and/or rear-view sensors. This sensor data 102 may be useful for identifying, detecting, classifying, and/or tracking movement of objects around the vehicle 500 within the environment. In embodiments, any number of sensors may be used to incorporate multiple fields of view (e.g., the fields of view of the long-range cameras 598, the forward-facing stereo camera 568, and/or the forward facing wide-view camera 570 of FIG. 5B) and/or sensory fields (e.g., of a LIDAR sensor 564, a RADAR sensor 560, etc.).

The sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

In some examples, such as for training (e.g., for training model 200 of FIG. 2A), the sensor data 102 generated by one or more vehicles may be used. In other examples, in addition to or alternatively from sensor data from vehicles, data from one or more fixed cameras observing segments of a road may be used. This type of data set may include two-dimensional (2D) positions or locations of objects over time in the field(s) of view of the fixed cameras. This data may then be converted to ego-vehicle centric representations by selecting a random object in the data set to be the ego-vehicle. As such, by identifying different objects as the ego-vehicle, the same data sets may be used to generate multiple ego-centric representations.

The sensor data 102 may be used by an object detector 104 to detect, identify, and/or track objects in the environment. For example, a machine learning model(s) (e.g., a deep neural network trained for object detection), a computer vision algorithm, and/or another type of object detection algorithm may be used to detect objects in the environment. Locations, speeds, velocities, acceleration, yaw angles, and/or other information about each of the objects may be determined using the object detector 104. In some examples, the speed, velocity, acceleration, yaw rate, angular velocity, and/or other information of the vehicle 500 may be determined using one or more sensors of the vehicle 500, and this information may be used to determine locations, speeds, velocities, etc. of the objects relative to the vehicle 500. As such, a temporal encoder 106 may use this relative information of the objects for encoding state information of the objects. For example, at an interval, and/or over a number of frames or time steps, the information about the objects in the environment may be determined using the object detector 104.

In some examples, the object detector 104 and/or another detector may use the sensor data 102 to determine additional information about the objects and/or the environment. For example, with respect to objects, brake lights, blinkers, flashing lights, and/or other indicators of the object may be detected. In addition, with respect to the environment, traffic lights, obstacles, pedestrians, bicyclists, road signals, and/or other environment features may be detected. This additional information from the object and/or the environment may be used in the process 100, such as to aid in predicting maneuvers by a maneuver predictor 114. In some examples, this additional information may be included in encoded states for objects as generated by the temporal encoder 106. Further, as described herein, the additional information may be included in a spatial encoding generated by the spatial encoder 108 (e.g., because the spatial encoder 108 may use the encoded states to generate the spatial encoding). As such, this additional information may be used to augment the other state information described herein with respect to the objects.

The temporal encoder 106 may be used to learn dynamics of vehicle motion at each interval, frame, and/or time step. In some examples, the temporal encoder 106 may include a recurrent neural network (RNN), such as a long short-term memory (LSTM) network, that may receive object information for an object of the objects—provided as information relative to the vehicle 500, in embodiments—and generate an encoded state for each object. The encoded state of the object may represent a state of motion of the object at the current interval, frame, or time step. The encoded state may be updated at each interval, frame, or time step as the updated object information for the current instance is provided to the temporal encoder 106. In some embodiments, object information for each object may be applied to a respective instantiation of the temporal encoder 106, where each instantiation for each object has shared weights. By using a separate temporal encoder—or LSTM—for each object, with shared weights, a more direct correspondence between the various aspects of the encoded states for each of the objects may be realized.

As an example, and with respect to FIG. 2A, state information 206 (e.g., state information 206A-206D) corresponding to each of a number of objects 204 (e.g., objects 204A-204D) may be tracked and used to generate an encoded state feature 210 (e.g., encoded state features 210A-210D) for each of the objects 204. In some examples, at least one of the objects 204 (e.g., the object 204C) may correspond to the vehicle 500 (e.g., the ego-vehicle), and the encoded state features 210A, 210B, and 210D of the other objects may have state information encoded relative to the object 204C, as described herein. Although four objects 204 are illustrated in FIG. 2A, this is not intended to be limiting, and any number of objects may be present and/or tracked at any given time depending on the embodiment. For example, as described herein, each of the objects 204 within a certain distance (e.g., radius, straight-line distance, etc.) to the vehicle 500 (e.g., the object 204C) may be tracked, in addition to the vehicle 500 itself (e.g., where relative information is used).

For each object 204, the state information 206 corresponding to the object 204 may be applied to an instantiation of an encoder LSTM 208 (e.g., encoder LSTMs 208A-208D corresponding to objects 204A-204D, respectively). The encoder LSTMs 208 may be used to generate the encoded state features 210 of the objects 204 using the state information 206, as described in more detail herein, at least with respect to FIG. 2B. In some examples, the encoder LSTMs 208 may be different where the object types are different. For example, where the objects are vehicles, there may be one type of (e.g., multiple instantiations of) an encoder LSTM 208, and where the objects are pedestrians, there may be another type of encoder LSTM 208. In such examples, where each object is a vehicle, each encoder LSTM 208 may be similar, and where each object is a pedestrian, each encoder LSTM 208 may be similar, but where some objects are vehicles and others are pedestrians, there may be an encoder LSTM 208 corresponding to the particular object type for each object. Vehicles and pedestrians is not intended to be limiting, and any object type may be used and have a corresponding type of encoder LSTM. In examples where two or more object types are identified and/or tracked and applied to encoder LSTMs 208, an additional object class label may be associated with each object when positioning the encoded state features 210 in the grid 212.

Grid 202 may represent a driving surface or other environment, such as, without limitation, a road, a highway, a parking lot, a waterway, and/or the like. The width of each cell of the grid 202 may represent a defined lateral dimension within the environment, such as, without limitation, the width of a demarcated (or inferred) lane of a driving surface, parking spaces, a width of a vehicle (e.g., an average width) or other object type, etc. The height of each cell of the grid 202 may represent a defined longitudinal dimension within the environment, such as, without limitation, a length of a vehicle (e.g., an average vehicle), a length of a water vessel, a length of a truck (e.g., an average 18 wheeler), a length of a different object type, etc. Locations of the objects 204 in the grid 202 may correspond to current locations of the objects in the driving environment (e.g., relative to the object 204C, or the ego-vehicle, in embodiments), and the state information 206 may correspond to prior locations—and corresponding state information, such as velocity, yaw angle, turning rate, etc.—of the objects 204 at those prior locations. Where the objects are tracked relative to the vehicle 500 (e.g., the object 204C), the grid 202 may be centered on the vehicle 500 (e.g., as illustrated in FIG. 2A), such that as the vehicle 500 moves through the environment, the grid 202 follows.

In some embodiments, the grid 202 and/or 212 may represent a two-dimensional (2D) map of the driving surface in the environment (e.g., in a straight line). As such, 2D locations in the grid 202 and/or 212 may correspond to locations in the environment correlated to the grid. By mapping the sensor data 102 to a grid 202 and/or 212, the state information of the objects 204 may be abstracted to a 2D (or three-dimensional (3D)) representation thereby decoupling the sensor data 102 from the prediction methodology.

In some examples, additional information about the driving surface may be determined, such as how many lanes there are; and whether the road is curved, straight, on an incline, decline, or flat, etc. This information may be extracted from the sensor data 102, such as cameras (e.g., an RGB camera), LIDAR sensors, RADAR sensors, GNSS sensors, and/or other sensors, in addition to, in embodiments, map data from one or more map applications. In such examples, where this additional information corresponding to the driving surface is determined, the grid 202 and/or grid 212 (or the spatial arrangement, more generally), may represent a more robust set of information. The spatial arrangement may thus include a (3D) mapping to the environment, and may include curves, straightaways, hills, and/or other features of the driving surface. As such, the spatial arrangement may change dynamically as new sensor data 102 and/or map data is generated and/or received by the vehicle 500 as the vehicle 500 moves through the environment. In examples using a more robust spatial arrangement or grid (e.g., 202, 212), the predictions from the process 100 or by the model 200 may have increased accuracy.

Figure 2B:
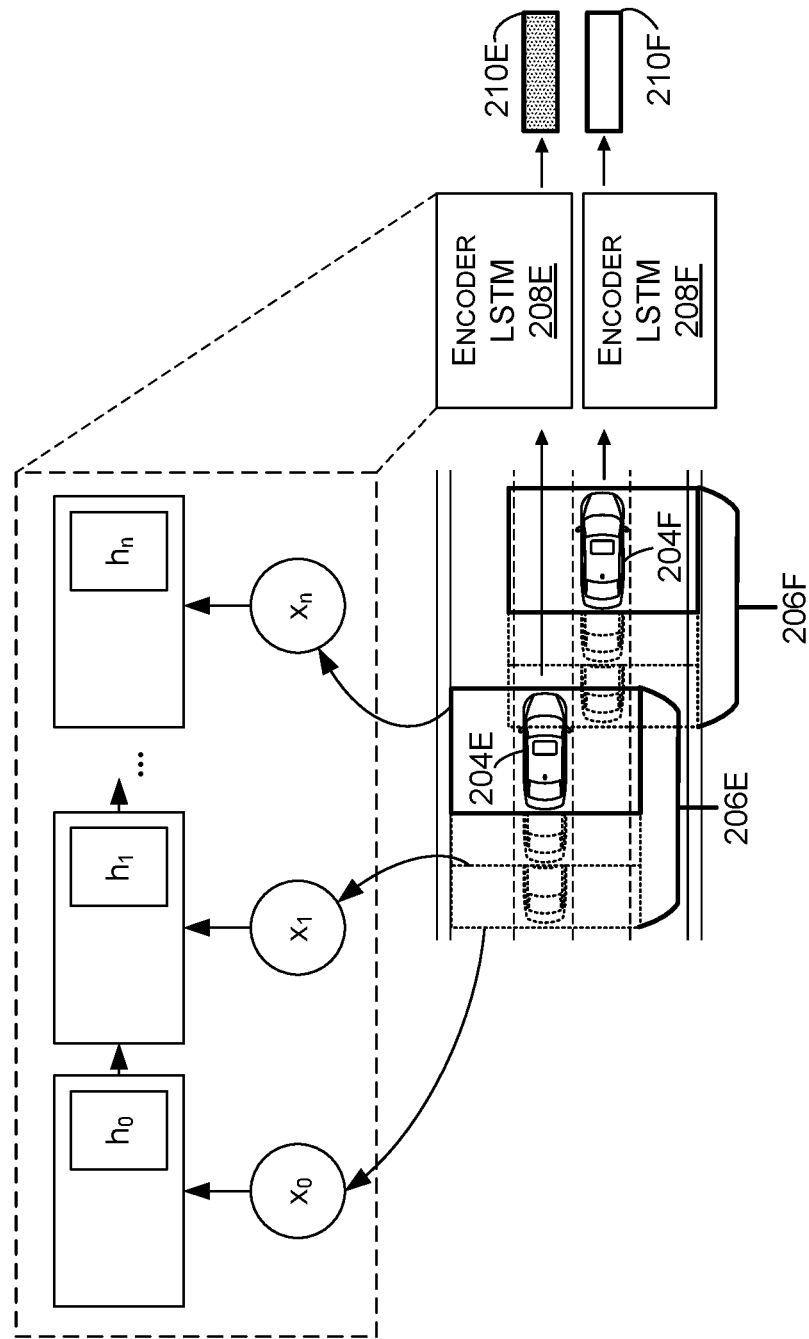
FIG. 2B includes an example illustration for generating encoded state features, in accordance with some embodiments of the present disclosure.

As another example, and with reference to FIG. 2B, state information 206E corresponding to object 204E and state information 206F corresponding to object 204F may be tracked over time. At each time step, x, the state information 206D may be applied to an encoder LSTM 208E, as illustrated. The encoder LSTM 208E may generate encoded state feature 210E corresponding to the object 204E at a current time, $x_n$. As described herein, a current state and the state of the object 204E may be tracked over a predefined number of time steps (e.g., without limitation, thirty times a second over five seconds, ten times a second over ten seconds, five times a second over five seconds, etc.). As such, the state information 206E applied to the encoder LSTM 208E may correspond to a current state (e.g., at $x_n$) and the state of the object 204E over the predefined number of time steps ($x_n$ through $x_{(n-1)}$). At a next time step, $x_{(n+1)}$, an oldest in time (e.g., $x_o$) state of the object 204E may be removed from consideration, and the new current state (e.g., at $x_{(n+1)}$) of the object 204E may be applied to the encoder LSTM 208E. In some examples, the state information 206E may be stored in a rolling buffer such that, at each time instance, an oldest state information is removed from the buffer and state information corresponding to a current state minus one time step (e.g., $x_{(n+1)}$) is added to the buffer. Similarly, for the object 204F, the state information 206F may be applied to an encoder LSTM 208F. This process may be repeated for each object 204 to generate the encoded state feature 210 for the object (e.g., for each of the objects 204A-204D of FIG. 2A to generate the encoded state features 210A-210D, respectively).

Referring again to FIG. 1, a spatial encoder 108 may generate a spatial encoding corresponding to a spatial arrangement of the objects in the environment. In some embodiments, the encoded states of the objects may be used to generate the spatial encoding. For example, when generating a spatial arrangement including the objects in the environment, an object applied to a discretized space (e.g., a cell) of the spatial arrangement (e.g., a grid) may be applied using data representative of the encoded state of the object. As such, the data representing an object in the discretized space of the spatial arrangement may include the data representing the encoded state of the object. In this way, the spatial arrangement is representative of a current arrangement of the objects in the environment—relative to the ego-vehicle, in embodiments—and historical state information of the objects as represented by the encoded states of the objects. This information may be used to provide a more accurate representation of each of the objects, and help to predict the next or future movements of the objects as they move through the environment.

As an example, and with reference to FIG. 2A, a spatial arrangement, or grid 212, may be populated to include the encoded state features 210 of the objects 204. The encoded state features 210 of the objects 204 may be applied to cells in the grid 212 based on the locations of the objects 204 in the environment (e.g., as depicted in the grid 202). In some embodiments, as described herein, the grid may be populated relative to the vehicle 500 (e.g., the ego-vehicle, or the object 204C). In such embodiments, the grid 212 may be populated to include the encoded state features 210A, 210B, and 210D of the objects 204A, 204B, and 204D, respectively, relative to the object 204C (where the object 204C may be centered in the grid 212). In some examples, the grid 202 and the grid 212 may correspond to one another. However, in non-limiting embodiments and for the purposes of assigning the objects 204, or the encoded state features 210 thereof, the encoded state features 210 may be positioned in only a single cell of the grid 212. For example, where an object 204 is determined to be located between two cells (e.g., the object 204B), the encoded state feature 210 (e.g., the encoded state feature 210B) of the object 204 may be positioned in a single cell. The single cell may be selected to be the cell that the object 204 overlaps with more (e.g., proportion of the area of the object 204), a cell that is closer to the ego-vehicle that the object 204 overlaps, and/or another cell based on a different selection criteria. In other embodiments, the encoded state feature 210 may be applied partly to two or more cells that the object 204 overlaps. For example, if an object 204, based on the historical state information of the object, overlapped a first cell for 30% of the tracked history period and a second cell for 70% of the tracked history period, the encoded state feature 210 may similarly be located with a 30/70 split in the grid 212.

Figure 2C:
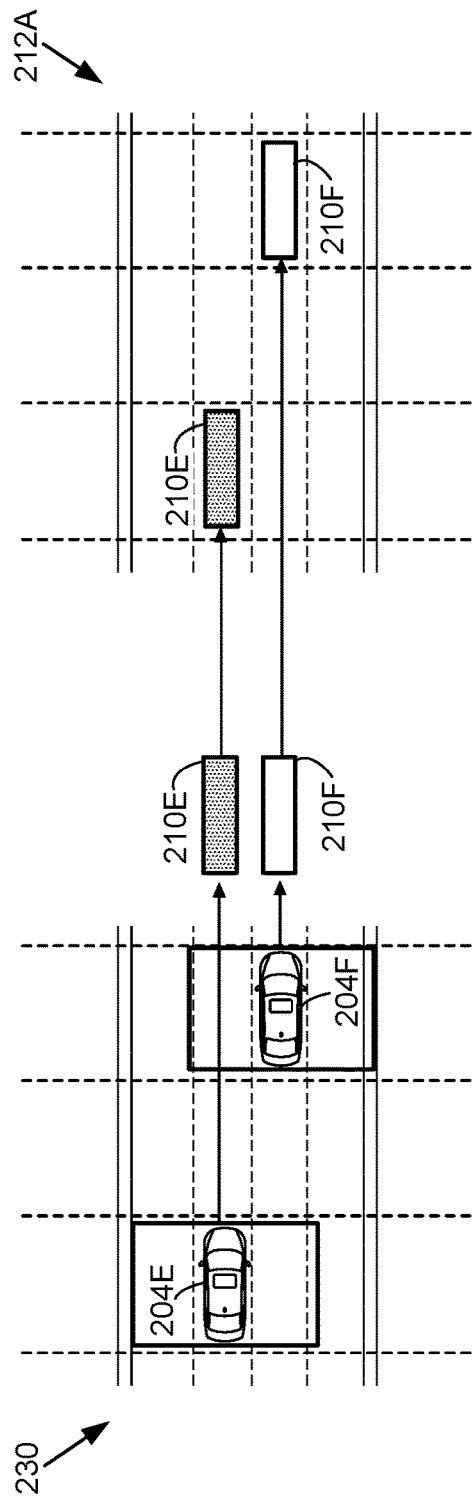
FIG. 2C includes an example illustration for populating a spatial arrangement, in accordance with some embodiments of the present disclosure.

As another example of populating the grid 212, and with reference to FIG. 2C, a current arrangement of the objects 204 (e.g., the objects 204E and 204F) may be determined from a current arrangement grid 230 (and/or from the grid 202, for example). A grid 212A (e.g., an example of the grid 212) may thus be populated with the encoded state features 210E and 210F corresponding to the objects 204E and 204F, respectively. As described herein, the location of the encoded state features 210E and 210F may correspond to the locations of the objects 204E and 204F in the current arrangement grid 230. As such, where the current arrangement grid 230 and the grid 212A represent a similar portion of the environment, the encoded state features 210E and 210F may be populated in respective cells in the grid 212A.

Referring again to FIG. 1, the spatial encoder 108 may generate the spatial encoding using any of a number of methods, such as, but not limited to, sequence encoding 110 and/or convolutional encoding 112. The spatial encoding may capture or represent the interdependencies of the motion and/or historical states of each of the objects in the environment. For example, with reference to sequence encoding 110, the discretized spaces of the spatial arrangement may correspond to a value (e.g., cell 1, cell 2, cell 3, and so on, for n number of cells). As such, a machine learning model, such as an RNN or, more specifically, a LSTM, may be used to generate the spatial encoding from the spatial arrangement using the sequence. For example, the machine learning model may learn based on training data applied according to the sequence, such that during inference the machine learning model may compute the spatial encoding using the sequence. The spatial encoding will thus apply, to the machine learning model, values corresponding to each discretized space according to the sequence, where each discretized space may correspond to an encoded state or may not correspond to any encoded state (and thus may have corresponding values of 0, or 1, for example). Where an encoded state is present in a discretized space, the values applied to the machine learning model for that discretized space in the sequence may correspond to the encoded state of the corresponding object. As a result, an understanding of the spatial arrangement of the objects may be encoded into a spatial encoding by the machine learning model, where the spatial encoding intrinsically accounts for the encoded states of each of the objects in the spatial arrangement at a current time. Using this method, the spatial encoding may be identical for each of the objects 204, thus allowing the spatial encoding to be reused for computing maneuvers (e.g., by a maneuver predictor 114) and/or trajectories (e.g., by a trajectory decoder 120) for each object. This is in contrast to conventional systems that use convolutional encoding to generate the spatial encoding, because conventional convolutional encoding requires that the object of interest be centered in the spatial arrangement relative to the other objects—thereby requiring that a different spatial arrangement be generated for each different object having maneuvers and/or trajectories predicted therefor. To train the machine learning models (e.g., LSTMs) for sequence encoding 110, a loss function may be used that computes a loss over the state information of each of the objects, rather than only having a single loss function for each object (as in conventional systems). For example, there may be a loss function corresponding to each of the objects, and each of the loss functions may be aggregated into a single loss function. In some examples, without limitation, the loss function used may be an adversarial loss function. In embodiments, different loss functions may be used at different phases of training In such an example, a first loss function (e.g., root mean square error (RMSE) loss) may be used for initial training of maneuver predictions (e.g., explained with respect to FIGS. 2F and 2G), and a second loss function (e.g., negative log-likelihood loss) may be used for training of maneuver predictions after the initial training.

In some embodiments, and with reference to the sequence encoding as illustrated in FIG. 2A, an encoded spatial feature(s) may be generated using a machine learning model(s)—such as an RNN(s) or, more specifically, an LSTM(s). As illustrated in FIG. 2A, two encoded spatial features may be generated using two machine learning models. For example, a forward-RNN may be used to generate a first encoded spatial feature 214 by applying values of each cell of the grid 212 in a first sequence to the forward-RNN. For example, the first sequence may include a top left cell to bottom right cell ordering, such that the values of the cells of the grid 212 are applied to the forward-RNN from the top left cell, to the top middle cell, to the top right cell, to the second row left cell, to the second row middle cell, and so on. As another example, a backward-RNN may be used to generate a second encoded spatial feature 216 by applying values of each cell of the grid 212 in a second sequence to the backward-RNN. For example, the second sequence may include a bottom right cell to top left cell ordering (e.g., a reverse ordering to the first sequence), such that the values of the cells of the grid 212 are applied to the backward-RNN from the bottom right cell, to the bottom middle cell, to the bottom left cell, to the second to last row right cell, to the second to last row middle cell, and so on. As such, the first encoded spatial feature 214 and the second encoded spatial feature 216 may include two different encodings of the spatial arrangement—inclusive of the encoded state features 210—at a current time. The combination of the forward-RNN and the backward-RNN may be referred to collectively herein as a bi-directional LSTM. Although a forward-RNN and a backward-RNN having the first sequence and the second sequence, respectively, are described herein, this is not intended to be limiting. The number of machine learning models and the sequences applied to them may differ depending on the embodiment, and the description herein is for example purposes only.

By using two or more different sequences applied to two or more machine learning models, the encoded spatial features may represent less bias, and overfitting to the training set may be reduced, thereby producing more accurate results for maneuver and/or trajectory predictions. In addition, as described herein, because the encoded spatial features may be predicted using sequence encoding, the encoded spatial features may be reusable for each object 204. As an example, and as illustrated in FIG. 2A, the first encoded spatial feature 214 and the second encoded spatial feature 216 may be used in combination with the encoded state feature 210D and the encoded state feature 210B (as well as the other encoded state features 210A and 210C) to predict maneuvers and/or trajectories for the object 204D and 204B, respectively.

Figure 2D:
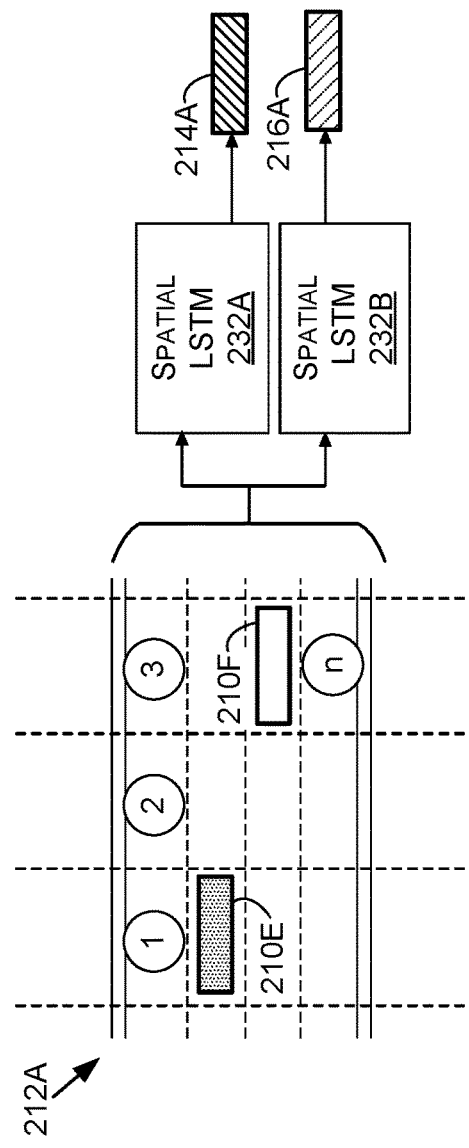
FIG. 2D includes an example illustration for generating encoded spatial features, in accordance with some embodiments of the present disclosure.

As another example of sequence encoding 110, and with respect to FIG. 2D, values associated with cells of the grid 212A may be applied to spatial LSTM 232A, spatial LSTM 232B, and/or another spatial LSTM 232 in a sequential order. For example, where the cells of the grid 212A are in the order of 1, 2, 3, . . . , n, as illustrated, the values associated with the cells of the grid may be applied to the spatial LSTM 232A in an order of 1, 2, 3, . . . , n, to generate a first encoded spatial feature 214A, and the values associated with the cells of the grid may be applied to the spatial LSTM 232B in an order of n, . . . , 3, 2, 1, to generate a second encoded spatial feature 216A. As another example, the values corresponding to the cells of the grid 212A may be applied from a top of the first column starting with 1 down through the first column, then start at the second column starting with 2 down through the second column, and so on. As such, any of a number of different sequences may be used to generate one or more encoded spatial features from the grid 212A.

Referring again to FIG. 1, and with respect to convolutional encoding 112, for each object, a spatial arrangement (e.g., grid 212 for the object 204C of FIG. 2A) may be defined relative to a current object being predicted (e.g., the object that the maneuver and/or trajectory is to be predicted for, because using convolutional encoding 112 may limit predictions to one object at a time, as described herein). The spatial arrangement corresponding to the object to be predicted may then be applied to a machine learning model, such as a convolutional neural network (CNN), to generate a spatial encoding. For example, a tensor may be generated that corresponds to the spatial arrangement, and the tensor (or data representative thereof) may be applied as input to the machine learning model. In some embodiments, and similar to the sequence encoding 110 described herein, the spatial arrangement, and thus the tensor, may be representative of the encoded states of the objects within the spatial arrangement.

Figure 2E:
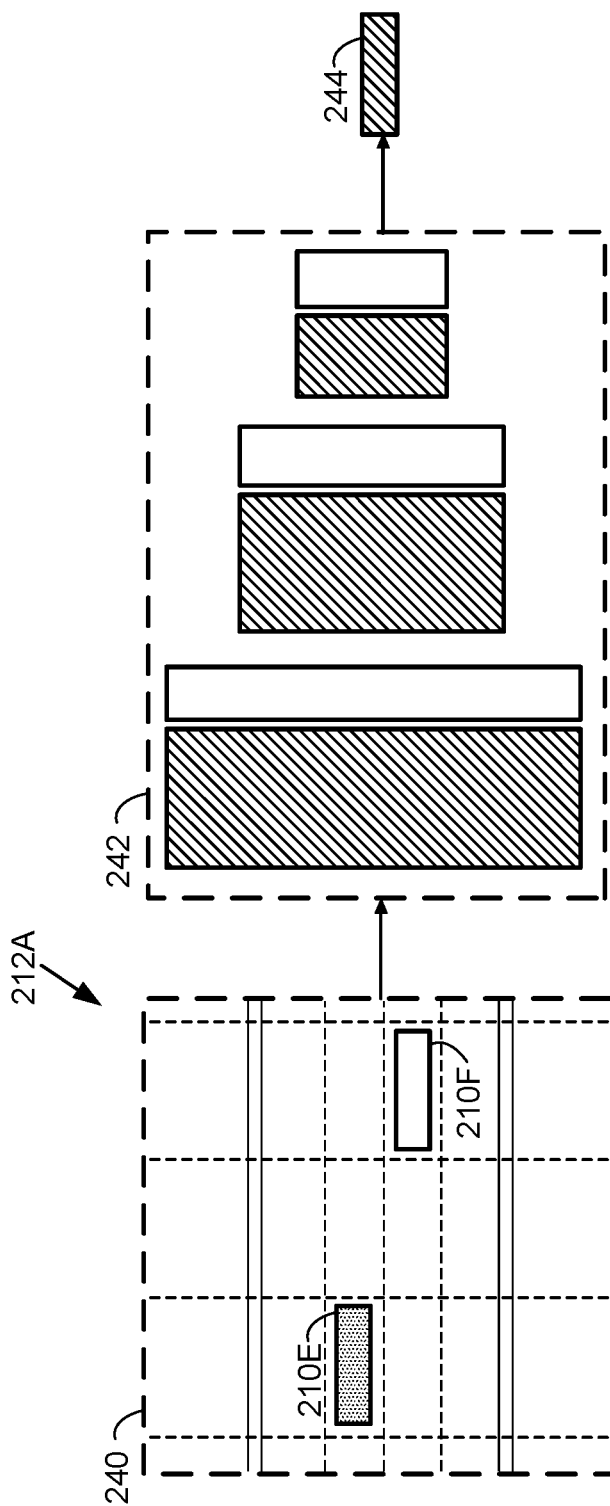
FIG. 2E includes another example illustration for generating encoded spatial features, in accordance with some embodiments of the present disclosure.

For example, and with respect to FIG. 2E, convolutional encoding 112 may be used to generate an encoded spatial feature 244 using a CNN 242. The grid 212A, populated to include the encoded state features 210E and 210F, may be used to generate a tensor 240 representative of the grid 212A. As such, data representative of the tensor 240 may be applied to the CNN 242 to generate the encoded spatial feature 244.

One or more of the layers of the CNN 242 may include an input layer. The input layer(s) may hold values associated with the tensor generated from the spatial arrangement.

One or more layers may include convolutional layers. The tensor data may be input into a convolutional layer(s) of the CNN 242 (e.g., after one or more input layers and/or other layer types). The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32× 12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the CNN 242 may not include any pooling layers. In such examples, strided convolution layers may be used in place of pooling layers.

One or more of the layers may include a fully connected layer. Each neuron in the fully connected layer(s) may be connected to each of the neurons in the previous volume. The fully connected layer may compute class scores, and the resulting volume may be 1×1×number of classes.

Although input layers, convolutional layers, pooling layers, ReLU layers, and fully connected layers are discussed herein with respect to the CNN, this is not intended to be limiting. For example, additional or alternative layers may be used, such as normalization layers, SoftMax layers, and/or other layer types.

Different orders and numbers of the layers of the CNN 242 may be used depending on the embodiment. As such, the order and number of layers of the CNN 242 is not limited to any one architecture. In addition, some of the layers may include parameters (e.g., weights and/or biases), such as the layers of the convolutional streams and/or the output layer(s), while others may not, such as the ReLU layers and pooling layers, for example. In some examples, the parameters may be learned during training. Further, some of the layers may include additional hyper-parameters (e.g., learning rate, stride, epochs, kernel size, number of filters, type of pooling for pooling layers, etc.), such as the convolutional layers, the output layer(s), and the pooling layers, while other layers may not, such as the ReLU layers. Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

Although described as a CNN 242, this is not intended to be limiting. For example, in addition to or alternatively from the CNN 242, another type of machine learning model(s) may be used. For example, and without limitation, any type of machine learning model may be used, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short-term Memory (LSTM), Hopfield, Boltzmann, deep belief, deconvolutional, generative adversarial, liquid state machine, etc.), and/or other types of machine learning models.

Using convolutional encoding 112, the encoded spatial feature 244 may correspond to a spatial encoding for a single object (e.g., an object (not shown) centered in the grid 212). As such, when using the spatial encoding to predict maneuvers and/or trajectories, the encoded spatial feature 244 may only be usable with respect to the object that the grid is centered on. As such, for the object 204E, the grid would have to be adjusted to center on the object 204E to generate a spatial encoding that is accurate for the object 204E, and similarly for the object 204F. Convolutional encoding 112 may be used in some embodiments of the present disclosure, but may increase run-time as compared to sequence encoding 110 when predicting maneuvers and/or trajectories for a plurality of objects.

Referring again to FIG. 1, a maneuver predictor 114 may be used to generate maneuver predictions for one or more of the objects in the environment. The maneuver predictor 114 may, without limitation, include a machine learning model, such as a neural network, a prediction algorithm, and/or another type of maneuver predictor 114. For example, where the maneuver predictor 114 is a neural network, the neural network may include any number of layers, such as those described herein at least with respect to the CNN 142 of FIG. 2E. For example, the encoded state generated by the temporal encoder 106 and the spatial encoding generated by the spatial encoder 108 may be applied, together, to the maneuver predictor 114. This process may be repeated for each of the objects—in parallel, in embodiments—such that maneuvers may be predicted for each object. For example, for an object and with respect to sequence encoding 110, the encoded state of the object may be applied with the universal spatial encoding (e.g., the spatial encoding that may be used for each of the objects, described with respect to at least FIG. 2D) from the sequence encoding 110 to the maneuver predictor 114. As another example, for an object and with convolutional encoding 112, the encoded state of the object may be applied with the spatial encoding corresponding to the object (e.g., as described with respect to at least FIG. 2E) to the maneuver predictor 114. As a result, the maneuver predictor 114 may predict a lateral maneuver 116, a longitudinal maneuver 118, or a combination thereof for the object. For example, the lateral maneuver 116 may include changing lanes to the left, changing lanes to the right, changing two lanes to the left, changing two lanes to the right, staying in the lane, making a turn, taking an exit, merging, turning around, and/or another lateral maneuver, and the longitudinal maneuver may include accelerating, braking, maintaining speed, and/or another longitudinal maneuver.

As an example, and with respect to FIG. 2A, for the object 204D, the encoded state feature 210D, the first encoded spatial feature 214, and the second encoded spatial feature 216 may be concatenated (block 218D) and applied to a maneuver classifier 220D. The maneuver classifier 220D may predict a lateral maneuver 116D and a longitudinal maneuver 118D for the object 210D using the concatenated (block 218D) information from the encoded state feature 210D, the first encoded spatial feature 214, and the second encoded spatial feature 216. As indicated in FIG. 2A, the output may be a value (e.g., a bit value, or one-hot bit values, in embodiments) for each of the longitudinal maneuver 118D and the lateral maneuver 116D. In the non-limiting example of FIG. 2A, the maneuver classifier 220D outputs for the lateral maneuver 116D may include three potential values (e.g., 0, 1, or 2) which may correspond to three possible lateral maneuvers (e.g., change lanes right, change lanes left, stay in lane). As another non-limiting example of FIG. 2A, the maneuver classifier 220D outputs for the longitudinal maneuver 118D may include two potential values (e.g., 0 or 1) which may correspond to two possible longitudinal maneuvers (e.g., brake or maintain speed). The output values for the lateral maneuver 116D and the longitudinal maneuver 118D may be concatenated (block 238D).

As another example, and with respect to FIG. 2F, the encoded state feature 210E, the encoded spatial feature 214A, and the encoded spatial feature 216A may be applied to a machine learning model 250, such as a neural network, to compute values corresponding to one or more lateral maneuvers (e.g., left lane change 252A, keep lane 252B, and right lane change 252C). As used herein, where the encoded spatial features 214A and/or 216A are indicated as being used, the encoded spatial feature 244 (FIG. 2E) may be used in addition or as an alternative to the encoded spatial features 214A and/or 216A. The machine learning model 250 may compute (as indicated in table 254), for the object 204E, a value of 0.05 for the left lane change 252A, a value of 0.92 for keep lane 252B, and a value of 0.03 for the right lane change 252C. As such, the determination may be that the object 204E is most likely to stay in the same lane of travel (e.g., keep lane 252B).

In addition, and with respect to FIG. 2G, the encoded state feature 210E, the encoded spatial feature 214A, and the encoded spatial feature 216A may be applied to a machine learning model 258, such as a neural network, to compute values corresponding to one or more longitudinal maneuvers (e.g., brake 260A and keep current/constant speed 260B). For example, the machine learning model 258 may compute (as indicated in table 262), for the object 204E, a value of 0.8 for keep current/constant speed 260B and a value of 0.2 for brake 260A. As such, the determination may be that the object 204E is most likely to maintain the current speed (e.g., keep current/constant speed 260B).

Each of the machine learning models 250 and 258 may include a neural network, such as a CNN, and may include one or more layers such as, but not limited to, those described herein with respect to FIG. 2E. In some embodiments, the machine learning model 250 and 258 may include, without limitation, a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long Short-Term Memory (LSTM), Hopfield, Boltzmann, deep belief, deconvolutional, generative adversarial, liquid state machine, etc.), and/or other types of machine learning models.

Referring again to FIG. 1, the outputs or predictions of the temporal encoder 106, the spatial encoder 108, and/or the maneuver predictor 114 may be used by a trajectory decoder 120 to determine a trajectory for one or more of the objects in the environment. For example, the trajectory decoder 120 may generate a predictive distribution for future motion and/or locations over a next number of frames or time increments for one or more of the objects. The trajectory decoder 120 may use, for a current time instance and one or more prior time instances (e.g., corresponding to a prior 1 second, 2 seconds, 3 seconds, 5 seconds, etc.), the encoded state for an object, the spatial encoding, and the maneuver predictions (e.g., lateral maneuver 116 and longitudinal maneuver 118). As such, each set of predictions corresponding to an object (e.g., encoded state, spatial encoding, and maneuver predictions) for each time instance within the rolling period of time for which the trajectory decoder 120 is trained to predict may be applied to the trajectory decoder 120, and the trajectory decoder 120 may output predicted locations.

The predicted locations may correspond to any number of future frames or positions at future times. For example, the predictions may correspond to a next two seconds, three seconds, five seconds, or another period of time into the future, and the predictions may include a prediction interval, such as thirty predictions per second, ten predictions per second, etc. As such, as a non-limiting example, the trajectory decoder 120 may generate fifty predictions where the future interval of time predicted is five seconds and there are ten predictions per second. In some examples, a mean, standard deviation, covariance, and/or other variables may be used to generate or update the predictions. For example, as the predictions correspond to times or locations further into the future, the likelihood of the predicted locations changing may increase (e.g., the predictions may be less accurate as the time into the future increases due to many factors—such as human variables, other objects changing locations, etc.). As such, the predictions may factor this in using the variables, such as mean, standard deviation, covariance, and/or other variables. The trajectory decoder 120 may—such as where the trajectory decoder 120 includes a LSTM—account for these variables during processing such that the predictions represent a future location (e.g., in the spatial arrangement) as well as a mean, standard deviation, covariance, and/or other variable values. As such, a trajectory modeler 122 may use this information to model the trajectories for the object(s) (as described herein at least with respect to FIG. 2H).

As an example, and with respect to FIG. 2A, the concatenated (block 218D) first encoded spatial feature 214, second encoded spatial feature 216, and encoded state feature 210D may be further concatenated (block 222D) with the concatenated (block 238D) lateral maneuver 116D and longitudinal maneuver 118D and applied to a decoder LSTM 224D. The decoder LSTM 224D may predict a first future location corresponding to a first future frame or time, and may predict a second future location corresponding to a second future frame or time, and so on. In addition, in some non-limiting embodiments, each prior prediction (e.g., corresponding to an earlier future frame or time) may be applied as another input to the decoder LSTM 224D for predicting a next or each next future prediction after the prior prediction(s). Each prediction 226D may be output as an (x, y) coordinate in the environment, or in the grid 202. As such, where the coordinate corresponds to the grid 202—and because the grid 202 has known corresponding locations in the environment—the location of the future prediction in the environment may be known. The predicted locations may thus be converted to real-world (or virtual-world, in embodiments implemented in or used with a simulation environment) locations in the environment for use by the vehicle 500 (e.g., the ego-vehicle) in determining a course or path through the environment. Where the predictions are used in a virtual environment, such as a simulation environment, the predictions may be used to control the objects through the virtual environment to more accurately reflect natural driving paths and trajectories for the objects. As such, for testing and training purposes, the virtual ego-vehicle may be tested in an environment where surrounding virtual objects are controlled according to these more accurate, more realistic trajectories predicted by the decoder LSTMs 224.

This example described with respect to FIG. 2A is directed to the object 204D, but this process may similarly be performed for each of the objects 204 in the grid 202 at each time instance. In some examples, the processes described herein with respect to FIG. 2A may be performed in parallel for each of the objects, thereby decreasing a runtime of the system for predicting the trajectories of each of the objects.

In some embodiments, as illustrated in FIG. 2A, the predictions 226 may be fed back to the state information 206 for one or more of the objects 204 such that the encoded states 210 are further generated based on future predictions of the decoder LSTM 224. In such an example, although not illustrated, the state information 206 may extend (e.g., be projected) forward from the object 204 in the grid 202, representing future state information of the object 204 as predicted by the decoder LSTM 224. By using one or more of the future predictions 226 of the decoder LSTM 224 (or the trajectory decoder 120, more generally), the predictions 226 of the decoder LSTM 224 may be more accurate further into the future, because the encoded state features 210 may be inclusive of prior known state information and future predicted state information for the objects 204.

With reference now to FIG. 2H, and with respect to the object 204E, the encoded state feature 210E, the first encoded spatial feature 214A, the second encoded spatial feature 216A, the lateral maneuver 252, and the longitudinal maneuver 260 corresponding to each time instance may applied to the decoder LSTM 224, and the decoder LSTM 224 may generate or compute predictions, N, at each frame or time. The predictions may include, for each time instance, a density function (or confidence value) for a space of 2D locations (e.g., grid 270, 272, or 274 of FIG. 2I), where the density function may be computed in view of one or more variables (e.g., mean, standard deviation, covariance, correlation, etc.). In some examples, the density function (which may be referred to as a heat map) may be computed for each possible maneuver. As such, using the heat maps and the maneuver confidences (described at least with respect to FIGS. 2F and 2G), a most likely trajectory for each object (e.g., vehicle) may be determined by finding peaks on the heat map corresponding to the highest ranked maneuver combinations (e.g., lateral and longitudinal maneuver combinations). As an example, a first set of inputs (e.g., the encoded state feature 210E, the first encoded spatial feature 214A, the second encoded spatial feature 216A, the lateral maneuver 252, and the longitudinal maneuver 260) may applied to the decoder LSTM 224 to update a first hidden state, $h_o$, a second set of inputs may be applied to the decoder LSTM 224 to update a second hidden state, $h_1$, and so on. In some embodiments, each hidden state may be passed to a next layer of the decoder LSTM 224 for updating the hidden state of the next layer. In addition, predictions, N, corresponding to each future frame or time, may be generated or computed by the decoder LSTM 224. As such, a first prediction, $N_n$, may be predicted, then a second prediction, Ni, and so on until prediction, N. In some embodiments, hidden states generated corresponding to a prior frame(s) or time(s) may be used by the decoder LSTM 224 for a next prediction(s) corresponding to a next future frame(s) or time(s). In this way, the decoder LSTM 224 may use, in addition to the set of inputs, the hidden states previously computed by the decoder LSTM 224 to make more accurate predictions further into the future.

Figure 2I:
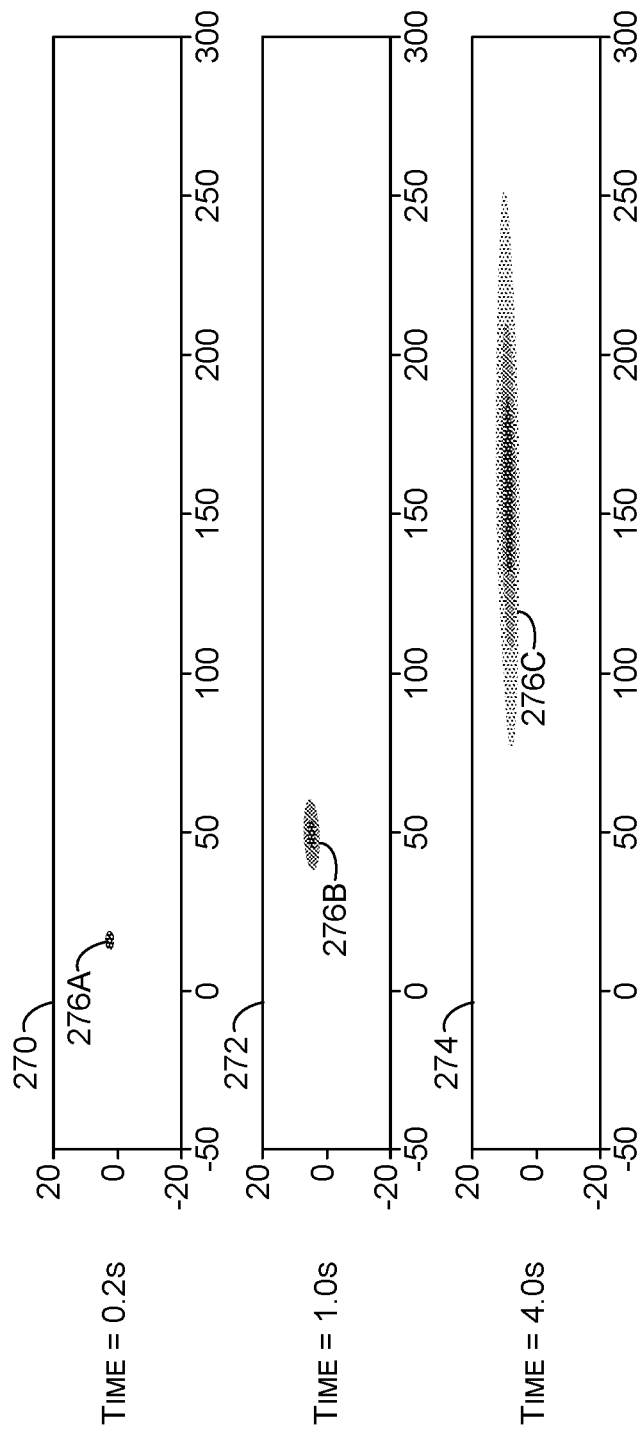
FIG. 2I includes an example illustration for modeling future trajectories for an object using predicted future locations, in accordance with some embodiments of the present disclosure.

With reference to FIG. 2I, a trajectory modeler (e.g., the trajectory modeler 122 of FIG. 1) may use the predictions, N, from the decoder LSTM 224 and model the trajectories. For example, the trajectory may be modeled using location regions 276 (e.g., location regions 276A-276C) computed at each frame or time, such as at 0.2 seconds, 1.0 seconds, and 4.0 seconds in FIG. 2I. As such, as illustrated, the further into the future the prediction, the larger the location region 276 may become, due to any number of variables in the environment including, but not limited to, those described herein. Once the location regions 276 are generated for each of the future frames or times, the full trajectory may be modeled using the location regions 276 (e.g., using a heat map representing the density functions corresponding to each maneuver combination). In some examples, the locations and/or location regions predicted by the decoder LSTM 224 (or the trajectory decoder 120, more generally) may be applied to a grid (e.g., a grid 270, 272, or 274) in order to determine the locations (e.g., (x, y) coordinates in a grid) from the heat maps. As such, because of the confidences associated with the heat maps, and after the heat map locations are correlated to locations in a grid, a confidence for locations in the grid may be determined. In this way, predicted future locations of objects with respect to the grid—and/or in a real-world or simulated environment—may be determined In some examples, each of the grids 270, 272, and 274, and each other grid for each other future frame or time may be a same grid. In further example, the grids 270, 272, and 274 may be similar to the current arrangement grid 230 of FIG. 2C, or the grid 212A. In other examples, the grids 270, 272, and 274 may be different grids than those used for generating the predictions. In any example, locations in the grids 270, 272, and 274, in addition to each other grid for each other future frame or time, may have known associations with locations in the environment (e.g., a real-world environment, a simulation environment, etc.). As such, the modeled trajectories generated from the locations and/or the location regions 276 (e.g., from the heat map) may be correlated to environmental locations and used for determining (e.g., in view of the modeled trajectories of virtual objects in the simulated environment) a trajectory for the vehicle 500 (e.g., the ego-vehicle) through a real-world environment, or for controlling virtual objects through a virtual or simulation environment (e.g., according to the modeled trajectories).

In some examples, using the heat maps (e.g., the density functions computed by the decoder LSTM 224 and represented as examples, in FIG. 2I), trajectories may be sampled for a given maneuver. For example, using a predicted maneuver (e.g., lateral and/or longitudinal), trajectories may be sampled using the density of the probability function computed by the decoder LSTM 224 (e.g., using the mean, covariance, standard distribution, etc). In such examples, if a large number of sample trajectories are taken, most of the sampled trajectories may be similar to the most likely trajectory, but some may be different. As such, when controlling virtual objects, for example, according to these sampled trajectories, the trajectories followed by the virtual objects may be more realistic because they may not always be the most likely trajectory (e.g., the trajectory of the virtual object may be a different trajectory than the most likely, thereby resembling human nature and realistic real-world conditions).

In further embodiments, decision tree pruning may be used to evaluate multiple moves into the future, where each move may correspond to a lateral and/or longitudinal maneuver. For example, conventional approaches may have evaluated each possible move in the future but, because of the confidence values corresponding to the maneuver predictions, certain moves may be pruned from the tree of possible moves. This allows for less computational expense while still allowing evaluation of the most likely moves into the future.

Referring again to FIG. 1, the trajectories output by the trajectory modeler 122 may be applied in any number of ways. For example, the trajectories of the objects may be applied to a drive stack 124 (e.g., an autonomous driving software stack, an ADAS software stack, etc.) of the vehicle 500 for use by the vehicle 500 in performing one or more operations. For example, a perception layer of the drive stack 124 may use the trajectories to determine prior, current, and future locations of the objects in the environment for updating a world model. A world model manager of the drive stack 124 may use the trajectories to update the world model to include the past, current, and/or prior locations of the objects. A planning layer of the drive stack 124 may use the past, current, and/or prior locations of the objects to determine one or more paths or trajectories for the vehicle 500 through the environment. A control layer of the drive stack 124 may use information from the perception layer, the world model manager, the planning layer, and/or other layers of the drive stack 124 to determine one or more controls for the vehicle 500 to control the vehicle according to a determined trajectory or path for the vehicle 500. As such, the predicted trajectories of the objects in the environment may be useful for any of a number of operations of the vehicle 500 corresponding to any of a number of different layers of the drive stack 124 of the vehicle 500.

As another example, the trajectories from the trajectory modeler 122 may be used by a simulator 126. The simulator 126 may be, in some embodiments, similar to that described in U.S. Non-Provisional application Ser. No. 16/366,875, filed on Mar. 27, 2019, which is hereby incorporated by reference in its entirety. The trajectories output from the trajectory modeler 122 may thus be used to control one or more objects (e.g., vehicles, pedestrians, bicyclists, water vessels, etc.) in a simulation or virtual environment. Using the process 100, the trajectories may be used to control the objects in a more natural, accurate manner, thus making the simulation environment more realistic for testing or training. In addition, in some examples, the simulator 126 may be trained to simulate human driven vehicles, autonomous vehicles, or a combination thereof. This may be used as an analysis tool to study the transition from human driven vehicles, to a combination of human driven and autonomous vehicles, to primarily or only autonomous vehicles.

Figure 3:
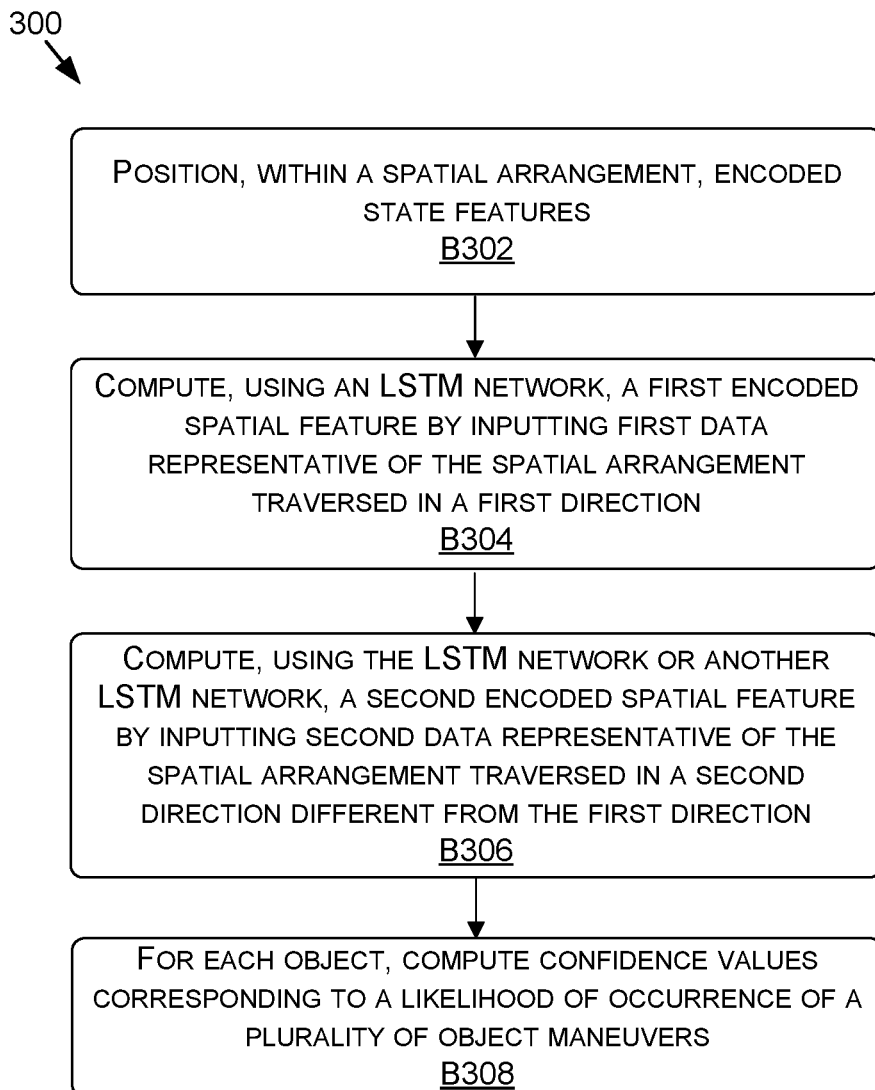
FIG. 3 is a flow diagram showing a method for computing object maneuvers, in accordance with some embodiments of the present disclosure.
Figure 4:
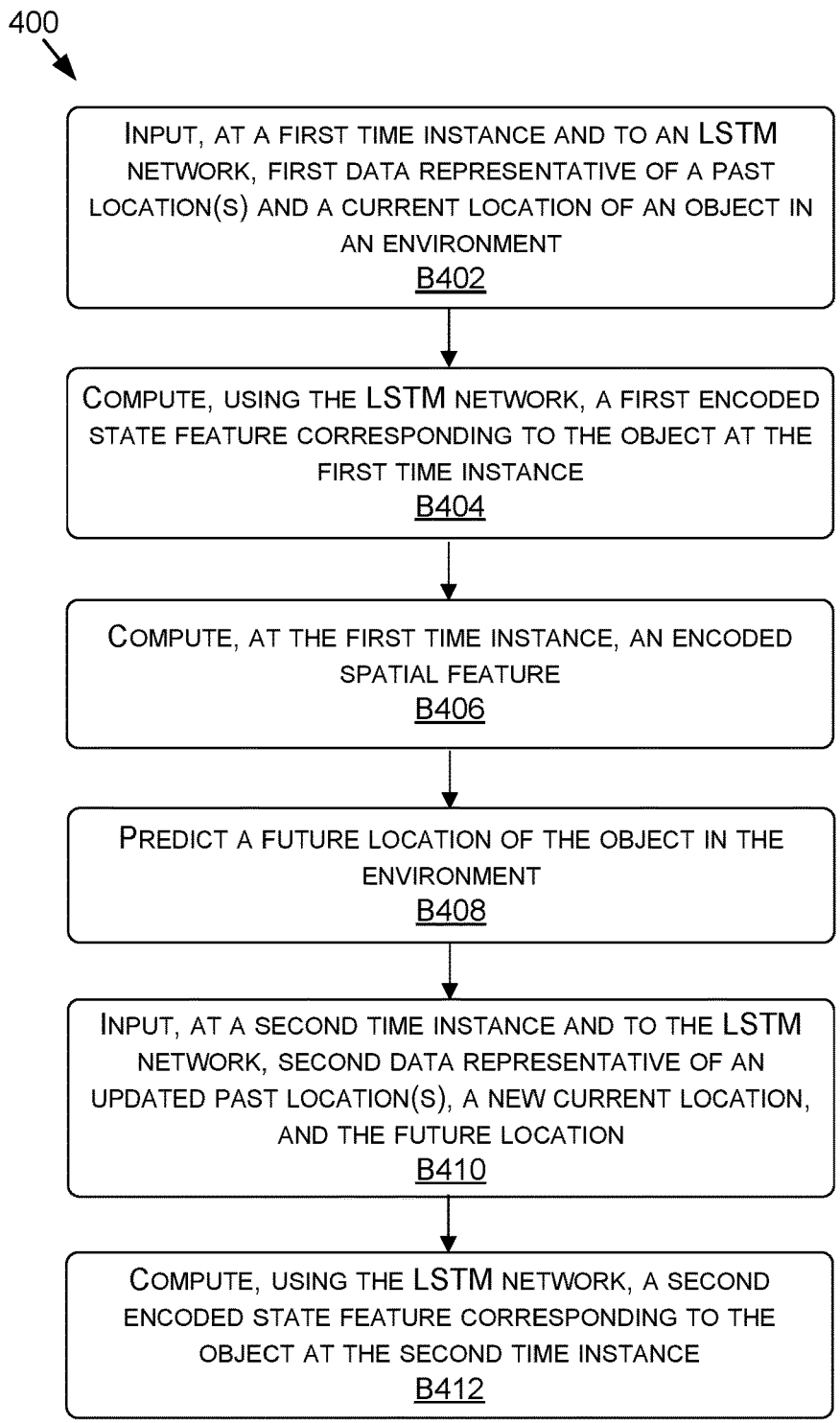
FIG. 4 is a flow diagram showing a method for computing an encoded state feature for an object using future predictions, in accordance with some embodiments of the present disclosure.

Now referring to FIGS. 3 and 4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, methods 300 and 400 are described, by way of example, with respect to the model 200 of FIG. 2. However, these methods may additionally or alternatively be executed by any one system, or any combination of systems, including, but not limited to, those described herein.

FIG. 3 is a flow diagram showing a method 300 for computing object maneuvers, in accordance with some embodiments of the present disclosure. The method 300, at block B302, includes positioning, within a spatial arrangement, encoded state features. For example, the grid 212 may be populated to include each of the encoded state features 210 corresponding to each of the objects 204.

The method 300, at block B304, includes computing, using an LSTM network, a first encoded spatial feature by inputting first data representative of the spatial arrangement traversed in a first direction. For example, the first encoded spatial feature 214 may be computed using the forward-RNN by applying data representative of the grid 212 traversed in a first direction (e.g., top left to bottom right) to the forward-RNN.

The method 300, at block B306, includes computing, using the LSTM network or another LSTM network, a second encoded spatial feature by inputting second data representative of the spatial arrangement traversed in a second direction, which may be different from the first direction. For example, the second encoded spatial feature 216 may be computed using the backward-RNN by applying data representative of the grid 212 traversed in a second direction (e.g., bottom right to top left) to the backward-RNN.

The method 300, at block B308, includes, for each object, computing confidence values corresponding to a likelihood of occurrence of a plurality of object maneuvers. For example, the lateral maneuver 116 and the longitudinal maneuver 118 may be computed for each object using the encoded state feature 210 corresponding to the object, the first encoded spatial feature 214, and the second encoded spatial feature 216. In some examples, a confidence may be computed for each possible longitudinal maneuver 118 and/or each possible lateral maneuver 116.

Now referring to FIG. 4, FIG. 4 is a flow diagram showing a method 400 for computing an encoded state feature for an object using future predictions, in accordance with some embodiments of the present disclosure. The method 400, at block B402, includes inputting, at a first time instance and to an LSTM network, first data representative of a past location(s) and a current location of an object in an environment. For example, the state information 206 corresponding to an object 204 may be provided as input to an instantiation of the encoder LSTM 208.

The method 400, at block B404, includes computing, using the LSTM network, a first encoded state feature corresponding to the object at the first time instance. For example, the encoded state feature 210 may be computed for the object 204, where the encoded state feature 210 may correspond to the first time instance.

The method 400, at block B406, includes computing, at the first time instance, an encoded spatial feature. For example, the encoded spatial feature (e.g., 214 and/or 216) may be computed at the first time instance.

The method 400, at block B408, includes predicting a future location of the object in the environment. For example, the encoded spatial feature, the encoded state feature 210, and/or one or more predicted maneuvers (e.g., the lateral maneuver 116 and/or the longitudinal maneuver 118) may be used to predict—e.g., by the decoder LSTM 224—a future location(s) of the object in the environment.

The method 400, at block B410, includes inputting, at a second time instance and to the LSTM network, second data representative of an updated past location(s), a new current location, and the future location. For example, the prediction(s) 226 of the model 200 may be fed back to the state information 206 for the object, and the prediction(s) 226 in addition to a new current location, and updated past location(s) may be provided as input to the instantiation of the encoder LSTM 208.

The method 400, at block B412, includes computing, using the LSTM network, a second encoded state feature corresponding to the object at the second time instance. For example, a second, updated encoded state feature 210 may be computed—using the prediction(s) 226—by the encoder LSTM 208 that correspond to the second time instance (e.g., after the first time instance).

Example Autonomous Vehicle

Figure 5A:
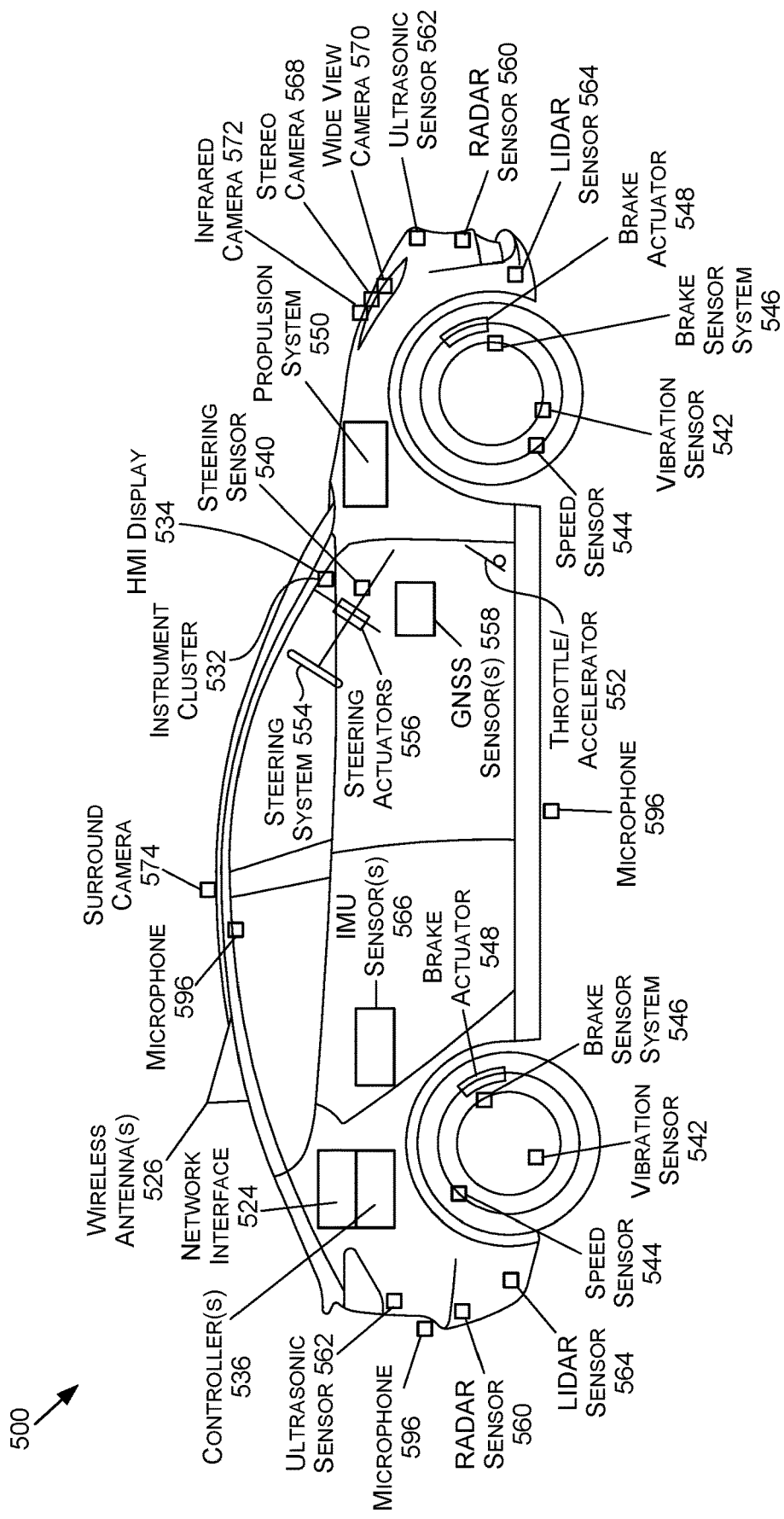
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3—Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
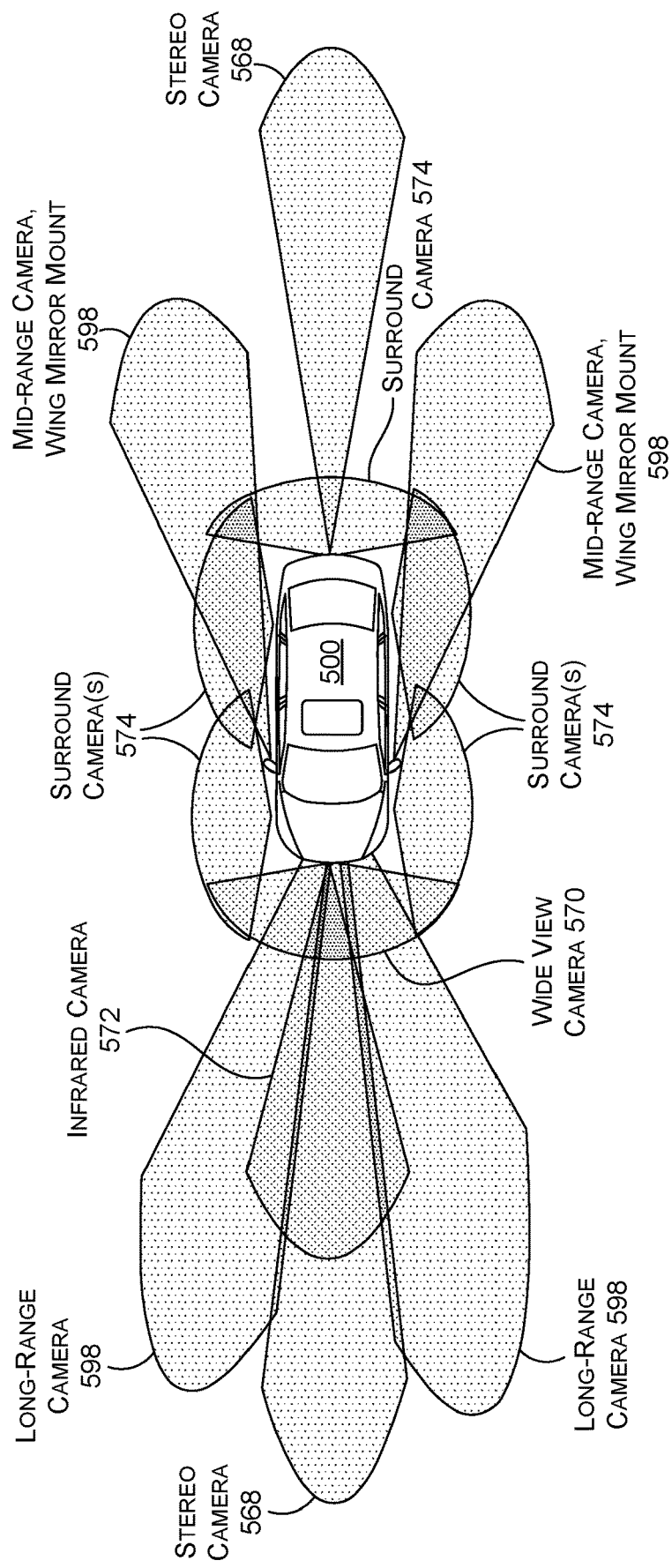
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 520 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
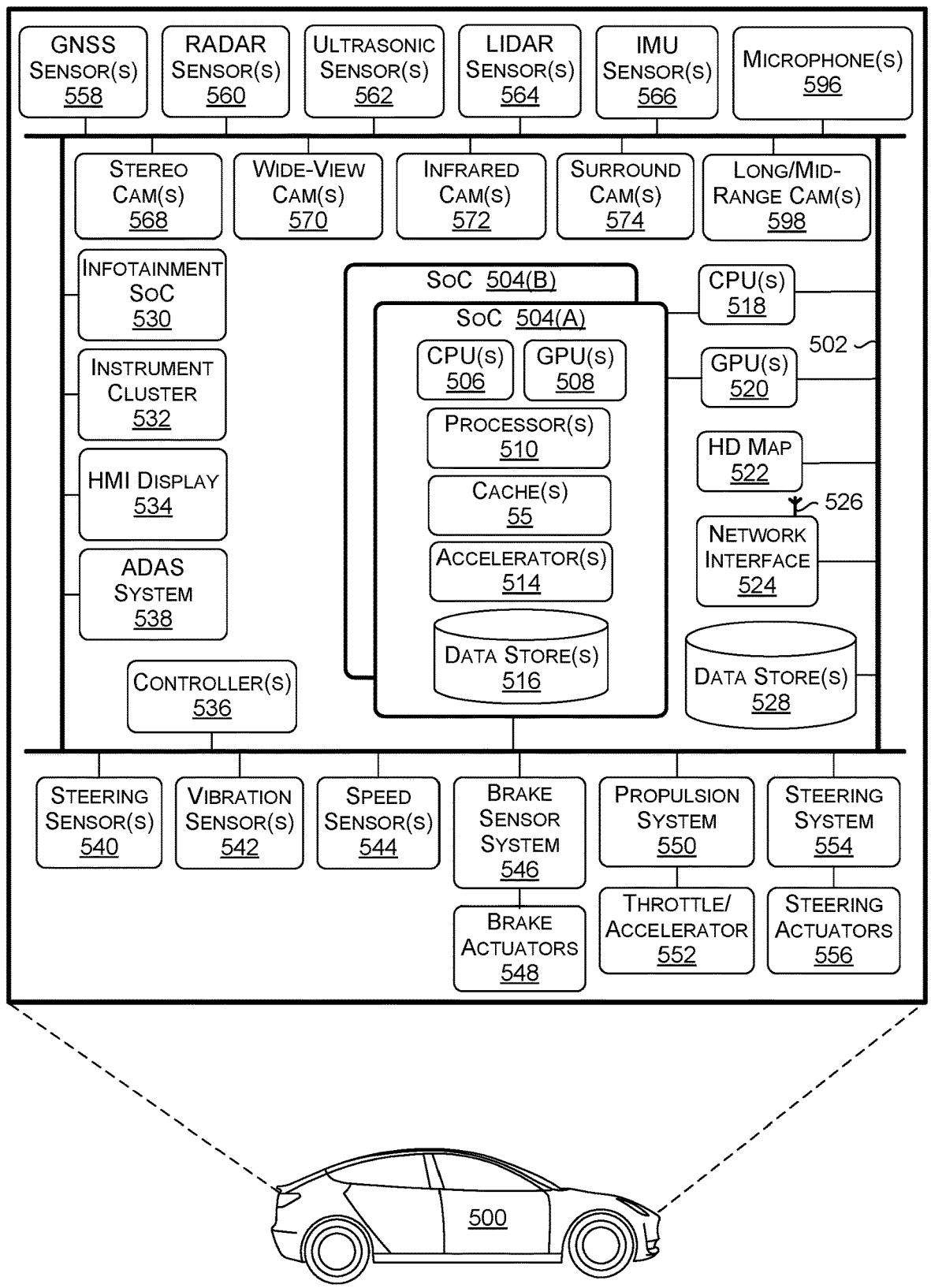
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s)

512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS and/or assisted GPS sensors), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 520-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly.

However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
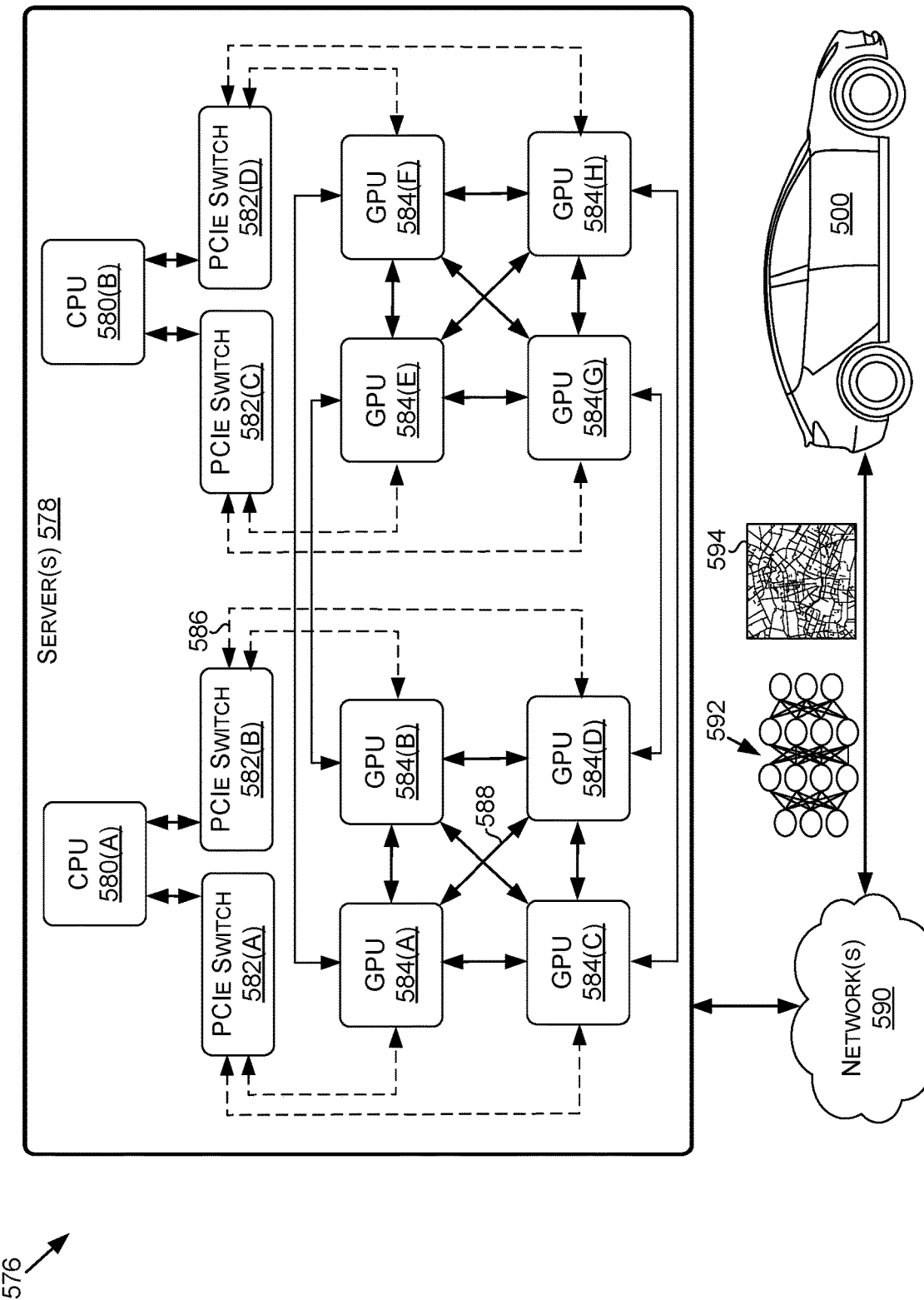
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
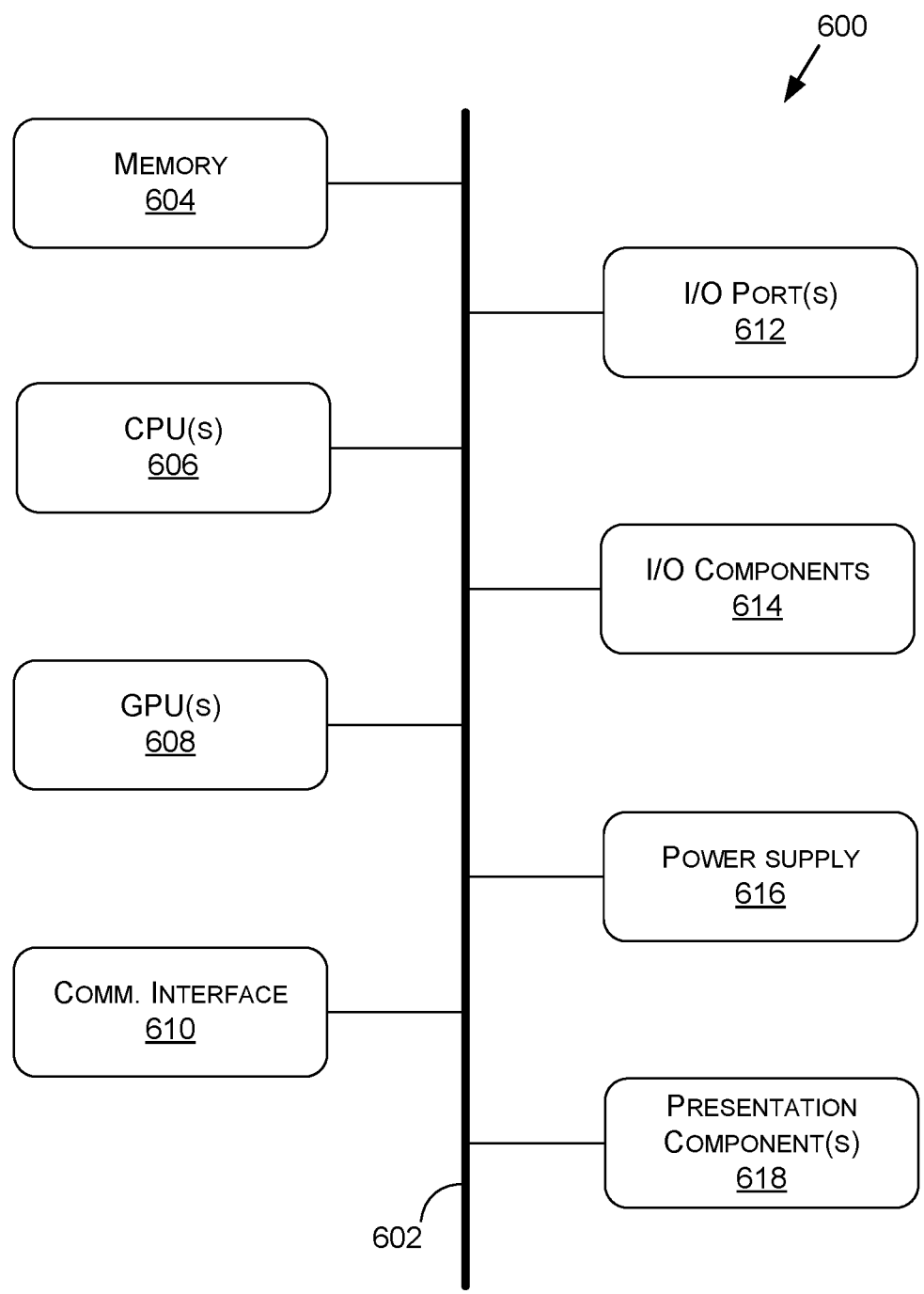
FIG. 6 is a block diagram of an example computing device suitable for use in implementing some embodiments of the present disclosure.

FIG. 6 is a block diagram of an example computing device 600 suitable for use in implementing some embodiments of the present disclosure. Computing device 600 may include a bus 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, and one or more presentation components 618 (e.g., display(s)).

Although the various blocks of FIG. 6 are shown as connected via the bus 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 6.

The bus 602 may represent one or more busses, such as an address bus, a data bus, a control bus, or a combination thereof. The bus 602 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 606 may be configured to execute the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an ARM processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

The GPU(s) 608 may be used by the computing device 600 to render graphics (e.g., 3D graphics). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data. The display memory may be included as part of the memory 604. The GPU(s) 708 may include two or more GPUs operating in parallel (e.g., via a link) When combined together, each GPU 608 may generate pixel data for different portions of an output image or for different output images (e.g., a first GPU for a first image and a second GPU for a second image). Each GPU may include its own memory, or may share memory with other GPUs.

In examples where the computing device 600 does not include the GPU(s) 608, the CPU(s) 606 may be used to render graphics.

The communication interface 610 may include one or more receivers, transmitters, and/or transceivers that enable the computing device 700 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   positioning, within a spatial arrangement, one or more encoded state features, each encoded state feature of the one or more encoded state features corresponding to a respective object in an environment, each encoded state feature being positioned at a location within the spatial arrangement that corresponds to a relative location of the respective object in the environment with respect to an ego-vehicle;
   computing, using a long short-term memory (LSTM) network, a first encoded spatial feature by inputting, to the LSTM network, first data representative of the spatial arrangement traversed in a first direction;
   computing, using the LSTM network or another LSTM network, a second encoded spatial feature by inputting, to the LSTM network or the another LSTM network, second data representative of the spatial arrangement traversed in a second direction different from the first direction; and
   for each respective object, computing confidence values corresponding to a likelihood of occurrence of a plurality of object maneuvers based at least in part on the encoded state feature corresponding to the respective object, the first encoded spatial feature, and the second encoded spatial feature.

2. The method of claim 1, wherein each encoded state feature is computed using a machine learning model and based at least in part on a plurality of prior locations within the environment of the respective object corresponding to the encoded state feature.

3. The method of claim 1, wherein the plurality of object maneuvers include lateral maneuvers selected from changing to a right adjacent lane, changing to a left adjacent lane, and staying in a current lane, and the plurality of object maneuvers further include longitudinal maneuvers selected from accelerating, decelerating, or maintaining a current speed.

4. The method of claim 1, further comprising:
based at least in part on the confidence values, determining one or more object maneuvers from the plurality of object maneuvers;
for each respective object, computing a density function corresponding to a space of future locations for the respective object based at least in part on the encoded state feature corresponding to the respective object, the first encoded spatial feature, the second encoded spatial feature, and the one or more object maneuvers.

5. The method of claim 4, wherein the density function represents a region of locations within the space of one or more future locations, the region of locations computed using at least one of: a standard deviation of the one or more future locations, a mean of the one or more future locations, or a covariance of the one or more future locations.

6. The method of claim 4, further comprising:
inputting, to a machine learning model, third data representative of a future location within the environment, the machine learning model for computing the one or more encoded state features; and
computing, using the machine learning model, an updated encoded state feature for the respective object using the third data.

7. The method of claim 6, wherein the updated encoded state feature is used to compute another future location after the future location for the respective object.

8. The method of claim 1, wherein the environment is a simulation environment, and at least an object maneuver from the plurality of object maneuvers is used to determine a trajectory for the respective object within the simulation environment.

9. The method of claim 1, wherein each encoded state feature of the one or more encoded state features is computed using a respective instantiation of an LSTM network.

10. A method comprising:
inputting, at a first time instance and to a long short-term memory (LSTM) network, first data representative of one or more past locations and a current location of an object in an environment;
computing, using the LSTM network and based at least in part on the first data, a first encoded state feature corresponding to the object at the first time instance;
computing, at the first time instance, an encoded spatial feature using the first encoded state feature and one or more additional encoded state features corresponding to one or more additional objects in the environment;
predicting a future location of the object in the environment using the encoded spatial feature and the first encoded state feature;
inputting, at a second time instance after the first time instance and to the LSTM network, second data representative of one or more updated past locations, a new current location, and the future location of the object in the environment; and
computing, using the LSTM network and based at least in part on the second data, a second encoded state feature corresponding to the object at the second time instance.

11. The method of claim 10, wherein the one or more past locations and the current location are represented as values relative to an origin point of an ego-vehicle in the environment.

12. The method of claim 10, wherein the computing the encoded spatial feature includes:
populating a spatial arrangement to include the first encoded state feature and the one or more additional encoded state features, the populating including positioning the first encoded state feature and the one or more additional encoded state features at spatial arrangement locations within the spatial arrangement, the spatial arrangement locations corresponding to relative locations of the object and the one or more additional objects in the environment with respect to an ego-vehicle; and
inputting, to a machine learning model, third data representative of the spatial arrangement.

13. The method of claim 10, wherein the first encoded state feature, the second encoded state feature, and the encoded spatial feature are computed based at least in part on sensor data generated by one or more sensors of an ego-vehicle.

14. The method of claim 10, wherein the encoded spatial feature is computed using a bi-directional LSTM network.

15. The method of claim 10, further comprising:
determining a predicted maneuver from a plurality of maneuvers based at least in part on the first encoded state feature and the encoded spatial feature,
wherein the predicting the future location of the object is further based at least in part on the predicted maneuver.

16. The method of claim 15, wherein the predicted maneuver includes a longitudinal component and a lateral component.

17. A system comprising:
one or more sensors to generate sensor data of an environment around a vehicle;
a computing device including one or more processing devices and one or more memory devices communicatively coupled to the one or more processing devices storing programmed instructions thereon, which when executed by the one or more processing devices causes instantiation of:
a temporal encoder to generate one or more encoded state features each corresponding to an object in an environment;
a spatial encoder to generate an encoded spatial feature from a spatial arrangement, the spatial arrangement including the one or more encoded state features;
a maneuver predictor to determine, based at least in part on the encoded spatial feature and an encoded state feature of the one or more encoded state features, a likelihood of one or more predicted maneuvers of a respective object corresponding to the encoded state feature; and
a trajectory decoder to determine one or more future locations of the respective object based at least in part on the encoded state feature, the encoded spatial feature, and the one or more predicted maneuvers.

18. The system of claim 17, wherein the spatial encoder uses a long short-term memory (LSTM) network to generate the encoded spatial feature, wherein the LSTM network uses first data representative of the spatial arrangement traversed in a first direction and second data representative of the spatial arrangement traversed in a second direction different from the first direction as input.

19. The system of claim 17, wherein, for each object in the environment, the temporal encoder uses an instantiation of a long short-term memory (LSTM) network to generate a respective encoded state feature for the object.

20. The system of claim 17, wherein the encoded state feature corresponds to a first time instance, and a temporal decoder uses the one or more future locations to generate an updated encoded state feature for a second time instance after the first time instance.

* * * * *